United States Patent [19]

Suzuki

[11] Patent Number: 5,727,915
[45] Date of Patent: Mar. 17, 1998

[54] MASTER INPUT APPARATUS FOR MICROGRIPPER AND MICROGRIPPER SYSTEM PROVIDED WITH THE MASTER INPUT APPARATUS

[75] Inventor: Yoshihiko Suzuki, Funabashi, Japan

[73] Assignee: Nikon Corporation, Tokyo, Japan

[21] Appl. No.: 622,870

[22] Filed: Mar. 29, 1996

[30] Foreign Application Priority Data

Mar. 29, 1995 [JP] Japan ................................. 7-096145

[51] Int. Cl.$^6$ ................................................ B25J 13/02
[52] U.S. Cl. ...................... 414/1; 74/523; 901/47; 414/4
[58] Field of Search ........................ 414/1–6; 901/47; 74/523

[56] References Cited

U.S. PATENT DOCUMENTS

| | | | |
|---|---|---|---|
| 4,468,162 | 8/1984 | Kuromoto | 414/4 |
| 4,679,976 | 7/1987 | Narishiage et al. | 414/4 |
| 5,368,428 | 11/1994 | Hussey et al. | 901/47 X |

FOREIGN PATENT DOCUMENTS 53-22980  8/1976  Japan.
59-153162 2/1983  Japan.
3-253870  10/1993 Japan.

*Primary Examiner*—Donald W. Underwood
*Attorney, Agent, or Firm*—Foley & Lardner

[57] ABSTRACT

A master input apparatus of the present invention comprises (i) a joystick apparatus having a joystick mounted as inclinable on a support body fixed at a predetermined position, the joystick apparatus generating a first control signal, based on an operation carried out by a hand of an operator on the joystick, and outputting the first control signal to a micromanipulator, thereby displacing a whole microgripper mounted on the micromanipulator; and (ii) a finger operating apparatus mounted on the joystick, the finger operating means generating a second control signal, based on an operation carried out by the hand of the operator thereon, and outputting the second control signal to the microgripper, thereby opening and closing of a pair of finger portions of the microgripper. This permits the operator of the master input apparatus to perform both the operation to open and close a pair of finger portions forming the microgripper and the operation to move the whole of the microgripper at a time by one hand, which facilitates operating the microgripper relative to the microscopic body. This improves the working efficiency of micromanipulation.

9 Claims, 25 Drawing Sheets

1

MASTER INPUT APPARATUS FOR MICROGRIPPER AND MICROGRIPPER SYSTEM PROVIDED WITH THE MASTER INPUT APPARATUS

BACKGROUND OF THE INVENTION

1. Field of the Invention

The present invention relates to a master input apparatus for operating a microgripper used for effecting gripping, movement, part assembling, cell fusion, etc. on a microscopic body, for example a microscopic living sample such as protozoa or an egg cell, or a microscopic mechanical part, and also to a microgripper system equipped with the master input apparatus and further having a moving apparatus and an observing apparatus of the microgripper, thereby performing operation, movement, observation, etc. of the microgripper.

2. Related Background Art

The microgripper is used for microscopic work including gripping, movement, assembling, deformation, processing, cell fusion, etc. of the protozoa or microscopic mechanical element under a microscope, and is arranged to grip a microscopic substance by opening and closing a pair of finger portions.

The inventor of the present application provides the microgripper disclosed in the bulletin of Japanese Laid-open Patent Application No. 5-253870, as an example of such a microgripper. In more detail, the inventor provides a microgripper comprising a support body, a pair of finger portions supported at one end by the support body and opposed to each other, and coil layers, formed in the pair of finger portions, as a means for opening and closing the pair of finger portions in accordance with a drive signal input therein. This microgripper is arranged to open and close the pair of finger portions by Lorentz force generated when an electric current is supplied to the coil layers as it is set under an external magnetic field.

The above bulletin of Japanese Application No. 5-253870 also discloses another microgripper of an electrostatic method and another microgripper using piezoelectric devices.

Each of the microgrippers as explained above is arranged to have the support body, the pair of finger portions supported at one end by the support body and opposed to each other, and the means for opening and closing the pair of finger portions in accordance with the drive signal input therein. Each of such microgrippers can operate to grip a microscopic substance, but the microgripper itself can neither move toward the microscopic substance nor move the microscopic substance gripped to another place.

The conventional microgripper system is arranged to perform the microscopic work as listed above by mounting the microgripper on the moving apparatus, moving the whole microgripper by the moving apparatus, and driving the microgripper to open and close the pair of finger portions. A master input apparatus for microgripper is used to make the microgripper perform the gripping operation, while another master input apparatus for moving apparatus is used to make the moving apparatus perform the moving operation. Namely, the microgripper system for performing the microscopic work as listed above is constructed of the microgripper, the moving apparatus, the master input apparatus for microgripper, and the master input apparatus for moving apparatus.

The conventional microgripper system, however, has the master input apparatus for microgripper and the master input apparatus for moving apparatus separately set, and a user (operator) needs to manipulate the microgripper using both hands. This is inconvenient because the operator cannot perform another operation as to the microgripper or an operation of another element such as the microscope while carrying out the operation as to the microgripper, that is, the opening and closing operation of fingers and the moving operation of the whole microgripper.

SUMMARY OF THE INVENTION

The present invention has been accomplished under the circumstances as described above, and a first object of the present invention is to provide a master input apparatus for microgripper that enables an operator to simultaneously carry out with one hand both the operation to open and close a pair of finger portions constituting the microgripper and the operation to move the whole of the microgripper.

A second object of the present invention is to provide a microgripper system equipped with the master input apparatus, which system can improve the working efficiency of micromanipulation by readily operating the microgripper relative to the microscopic body.

In order to achieve the first object, a master input apparatus of the present invention comprises (i) a joystick apparatus having a joystick mounted as inclinable on a support body fixed at a predetermined position, the joystick apparatus generating a first control signal, based on an operation carried out by a hand of an operator on the joystick, and outputting the first control signal to a micromanipulator, thereby displacing a whole microgripper mounted on the micromanipulator; and (ii) a finger operating apparatus mounted on the joystick, the finger operating means generating a second control signal, based on an operation effected by the hand of the operator thereon, and outputting the second control signal to the microgripper, thereby opening and closing a pair of finger portions of the microgripper.

Here, the finger operating means preferably comprises an operation moving portion, mounted as movable on the joystick, for moving based on the operation carried out by the hand of the operator thereon in order to open and close the pair of finger portions of the microgripper, and a signal generating portion for outputting the second control signal in accordance with movement of the operation moving portion relative to the joystick.

In this case, the operation moving portion may be a protruding lever hinged on the joystick and the signal generating portion may be a rotary potentiometer or a rotary encoder for converting an amount of rotation of an input rod as a rotational shaft of the protruding lever to the joystick, fixed to the protruding lever into a signal, and outputting it as the second control signal.

Also, the operation moving portion may be a button switch telescopically mounted on the joystick and the signal generating portion may be a direct-acting potentiometer or a direct-acting encoder for converting an amount of displacement of an input rod as a support shaft of the button switch to the joystick, fixed to the button switch into a signal, and outputting it as the second control signal.

The finger operating means may also be preferably a piezoelectric converter fixed to the joystick, the piezoelectric converter piezoelectrically converting an amount of a pressure applied by the operation effected by the hand of the operator thereon in order to open and close the pair of finger portions of the microgripper into an electric signal, and outputting it as the second control signal.

Further, a desirable embodiment of the joystick apparatus further comprises a dial mounted as rotatable on the joystick, the dial rotating based on the operation performed by the hand of the operator thereon in order to vertically displace the whole microgripper, and a signal generating portion for converting an amount of rotation of the dial relative to the joystick and an amount of inclination of the joystick relative to the support body into a signal and outputting it as the first control signal.

In this case, the signal generating portion may be an injection for converting an amount of displacement of a piston to which the amount of rotation of the dial relative to the joystick and the amount of inclination of the joystick relative to the support body are transmitted, into a hydraulic signal, and outputting it as the first control signal.

Also, the signal generating portion may be a potentiometer or an encoder for converting an amount of movement of an input rod to which the amount of rotation of the dial relative to the joystick and the amount of inclination of the joystick relative to the support body are transmitted, into an electric signal, and outputting it as the first control signal.

Next, in order to achieve the second object, a microgripper system of the present invention comprises (a) a micromanipulator fixed near a stage; (b) a microgripper mounted on the micromanipulator and positioned in the vicinity of a microscopic body held by the stage; (c) a master input apparatus for controlling the micromanipulator to displace the whole of the microgripper relative to the microscopic body and controlling opening and closing of a pair of finger portions of the microgripper to make the microgripper grip or release the microscopic body; and (d) a microscope apparatus for projecting an enlarged image of a motion of the microgripper relative to the microscopic body. The master input apparatus comprises (i) a joystick apparatus having a joystick mounted as inclinable on a support body fixed at a predetermined position, the joystick apparatus generating a first control signal, based on an operation carried out by a hand of an operator on the joystick, and outputting the first control signal to the micromanipulator, thereby displacing the whole microgripper mounted on the micromanipulator; and (ii) a finger operating apparatus mounted on the joystick, the finger operating apparatus generating a second control signal, based on an operation carried out by the hand of the operator thereon, and outputting the second control signal to the microgripper, thereby opening and closing a pair of finger portions of the microgripper.

Here, the microgripper preferably comprises a support substrate fixed to the micromanipulator, a pair of finger portions supported in a cantilever form by the support substrate and opposed to each other, and coil thin films formed along surfaces of the pair of finger portions, for conducting drive signals input thereto in accordance with the second control signal output from the master input apparatus.

In this case, the microgripper system desirably further comprises magnetic field generating means mounted near said stage, which means generates a magnetic field in a direction perpendicular to a longitudinal direction of the coil thin films to apply the magnetic field to the microgripper.

The microgripper system preferably further comprises a central control unit for arithmetically processing the second control signal input thereto from the master input apparatus to output a third control signal, and a direct current power supply for outputting the drive signal to the microgripper, based on the third control signal input thereto from the central control unit.

Further, the microgripper system preferably further comprises an image pickup device mounted on the microscope apparatus, for taking a microscopical image in which the microscopic body and the microgripper are projected, and a monitor device mounted near the master input apparatus, for displaying the microscopical image, based on an image signal input thereto from the image pickup device.

Incorporated in the master input apparatus for microgripper in the above arrangement are the master input function for micromanipulator for moving the whole microgripper and the master input function for microgripper for opening and closing the pair of the finger portions of the microgripper mounted on the micromanipulator. Because of this arrangement, the apparatus according to the present invention can simultaneously perform both the opening and closing operation of the pair of finger portions of the microgripper and the moving operation of the whole microgripper by one hand.

The present invention will become more fully understood from the detailed description given hereinbelow and the accompanying drawings, which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
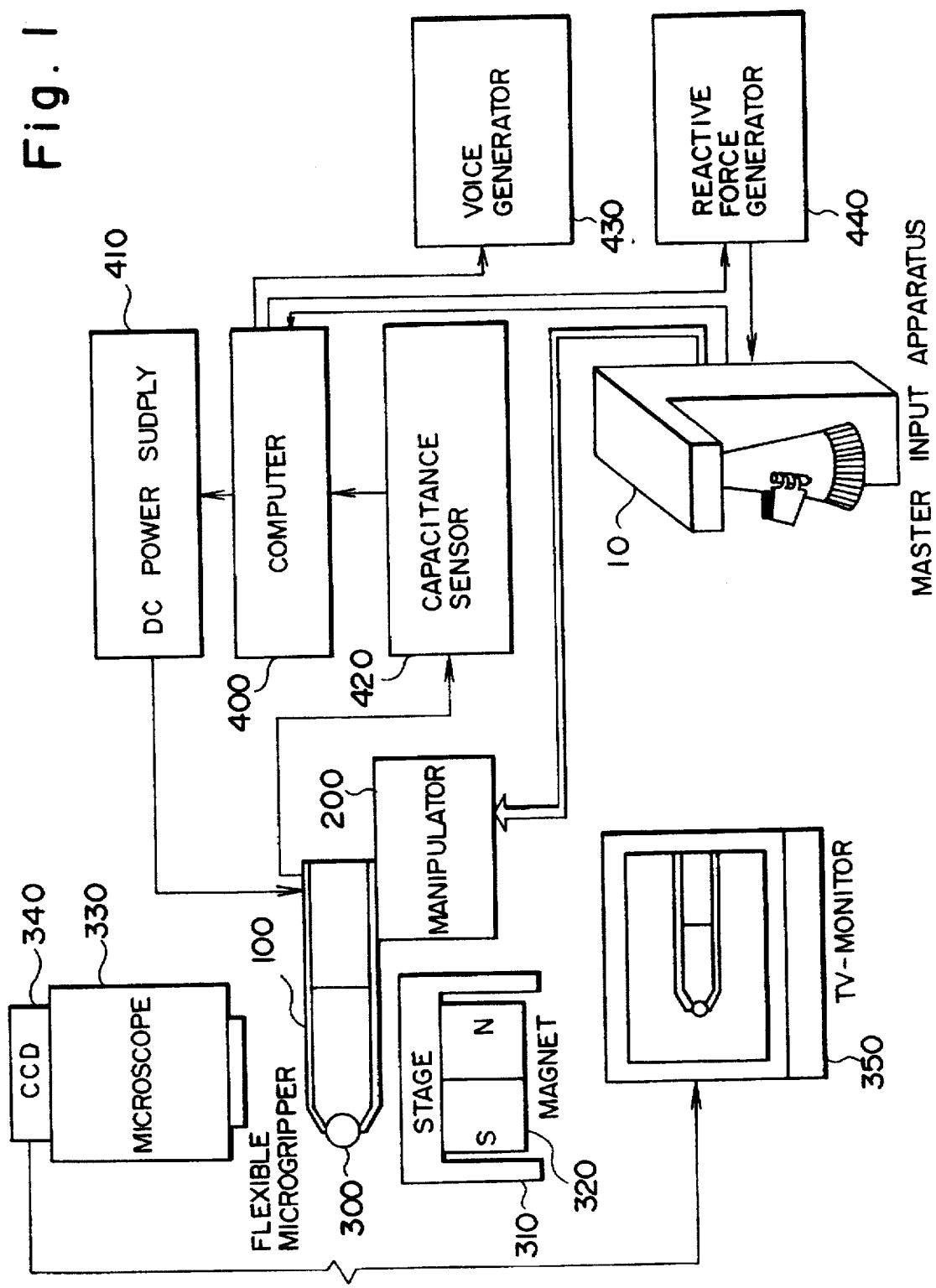
FIG. 1 is a block diagram to show the configuration of the first embodiment associated with the microgripper system of the present invention.

The constitution and operation will be explained in detail with various embodiments of the master input apparatus for microgripper and the microgripper system provided therewith, according to the present invention, with reference to FIG. 1 to FIG. 29D. In the explanation of the drawings, same elements will be denoted by same reference numerals and redundant explanation will be omitted. It is also noted that dimensional scales in the drawings do not always coincide with those in the explanation.

First Embodiment

As shown in FIG. 1, a microscopic body 300 as an operated object is held on the surface of stage 310 in the microgripper system of the present embodiment. A micromanipulator 200 is fixed near the stage 310. A microgripper 100 is mounted on a drive portion of the micromanipulator 200. Finger portions of the microgripper 100 are positioned in the vicinity of the microscopic body 300.

The micromanipulator 200 is connected to the master input apparatus 10 by a hydraulic conductor cable, and three-dimensionally and finely moves the whole of the microgripper 100, based on a hydraulic control signal output from the master input apparatus 10. The microgripper 100 is electrically connected through a computer 400 and a dc power supply 410 to the master input apparatus 10 and opens and closes the finger portions, based on an electric control signal output from the master input apparatus 10.

A magnetic field generator 320 is set below the stage 310. This magnetic field generator 320 is a permanent magnet or an electromagnet for generating a magnetic field in order to open and close the finger portions of the microgripper 100. Namely, a direction of flux of the magnetic field generated by the magnetic field generator 320 is set in parallel with the longitudinal direction of the finger portions of the microgripper 100.

A microscope apparatus 330 and an image pickup device 340 are set as incorporated together above the stage 310. The microscope apparatus 330 is an optical sytem for projecting an enlarged image of a motion of the microgripper 200 relative to the microscopic body 300. The image pickup device 340 is a CCD camera for taking a microscopical image projected by the microscope apparatus 330. A monitor device 350 is set near the master input apparatus 10. The monitor device 350 is a television monitor for indicating the microscopical image, based on a radio image signal input thereto from the image pickup device 340.

The computer 400 outputs, based on an electric control signal input thereto from the master input apparatus 10, an electric control signal for adjusting a voltage applied to the microgripper 100 to the dc power supply 410. The dc power supply 410 outputs, based on the electric control signal input thereto from the computer 400, an electric drive signal having the voltage value thus adjusted to the microgripper 100.

The microgripper 100 is electrically connected through a capacitance sensor 420 to the computer 400. This capacitance sensor 420 detects an electric capacitance of the microgripper 100 in accordance with the opening and closing states of the finger portions of the microgripper 100 and the gripping state of the microscopic body 300 by the finger portions of the microgripper 100, and outputs an electric detection signal indicating a value of capacitance thus detected to the computer 400.

The computer 400 is electrically connected to a voice generator 430. The voice generator 430 is an acoustic speaker for generating a voice modulated in at least one of the frequency and amplitude, based on the electric control signal input thereto from the computer 400 in accordance with the capacitance value of the microgripper 100.

The computer 400 is electrically connected to a reactive force generator 440, and the reactive force generator 440 is connected to the master input apparatus 10 by an electric cable or a mechanical wire. The reactive force generator 440 is an electromagnetic brake or a wire brake for generating in an operational portion of the master input apparatus 10 a frictional resistance having a positive correlation with gripping strength on the microscopic body 300 by the finger portions of the microgripper 100, based on an electric control signal input thereto from the computer 400 in accordance with the capacitance value of the microgripper 100.

Figure 2:
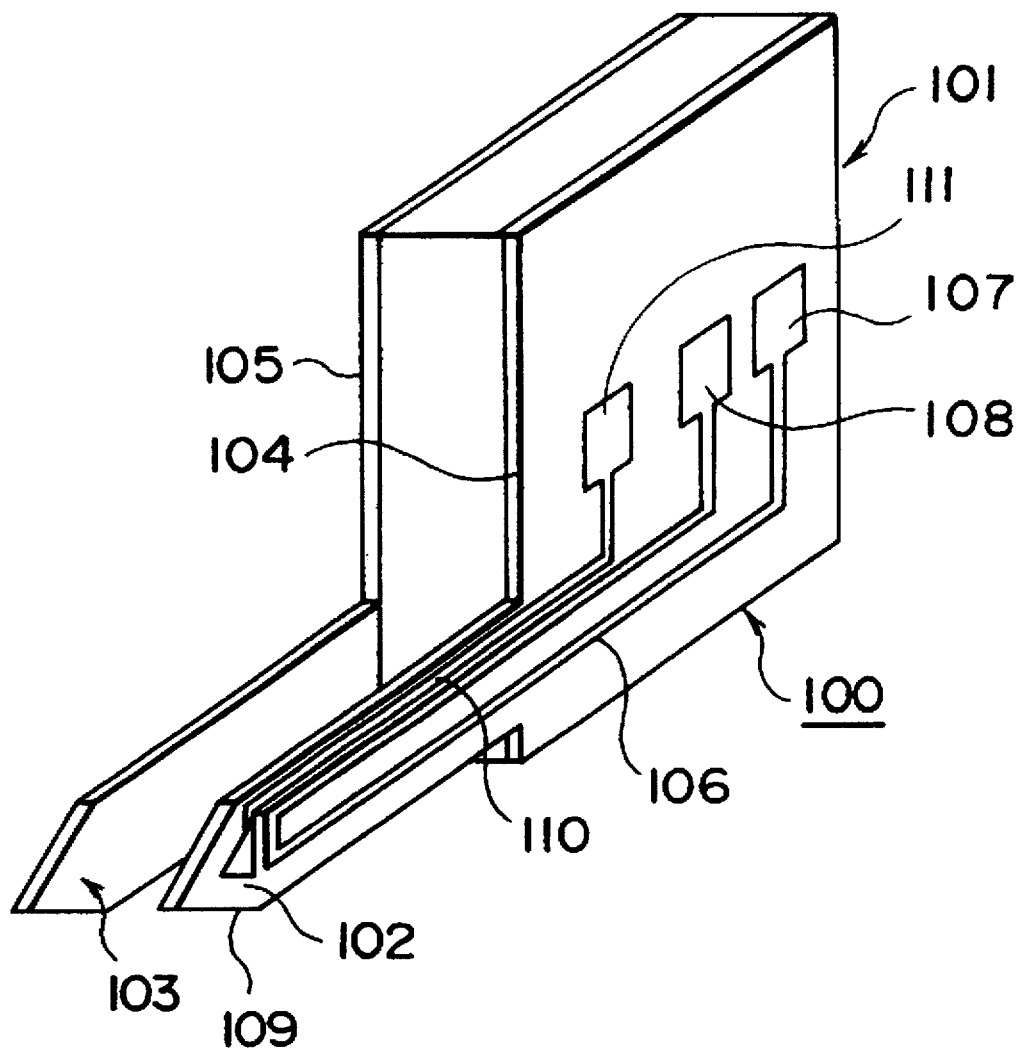
FIG. 2 is a perspective view to schematically show the configuration of the microgripper installed in the microgripper system of FIG. 1.

The microgripper 100 is composed of, as shown in FIG. 2, a support substrate 101 fixed at a predetermined position and a pair of flexible finger portions 102, 103 supported at one end by the support substrate 101 and opposed to each other. The pair of finger portions 102, 103 are flexible plates extending outward of the support substrate 101 from two silicon nitride films 104, 105 formed on the both sides of the support substrate 101. Coil layers 106 are formed along the peripheral regions on outer surfaces of the pair of finger portions 102, 103. The coil layers 106 are connected to two electrode pads 107, 108 for electrical connection to the outside, formed on the two silicon nitride films 104, 105 fixed to the support substrate 101.

A metal plate 109 is formed in a triangular pattern at the tip region on the outer surface of each of the pair of finger portions 102, 103. The each metal plate 109 is connected to an electrode pad 111 for electrical connection to the outside, formed on either of the two silicon nitride films 104, 105 fixed to the support substrate 101, by a wiring layer 110 formed on the outer surface of each of the pair of finger portions 102, 103.

The coil layer 106 and two electrode pads 107, 108 are integrally formed of a same conductive material NiCr/Au. The metal plate 109, wiring layer 110, and electrode pad 111 are integrally formed of a same conductive material NiCr/Au. The electrode pads 111 are electrically connected to the capacitance sensor 420.

The microgripper 100 can be fabricated by the normal semiconductor fabrication techniques, and opens and closes the pair of finger portions 102, 103 opposed to each other as they are bent by the Lorentz force generated based on an electric current supplied to each of the coil layers 106 in the pair of finger portions 102, 103 under the external magnetic field generated by the magnetic field generator 320.

Figure 3:
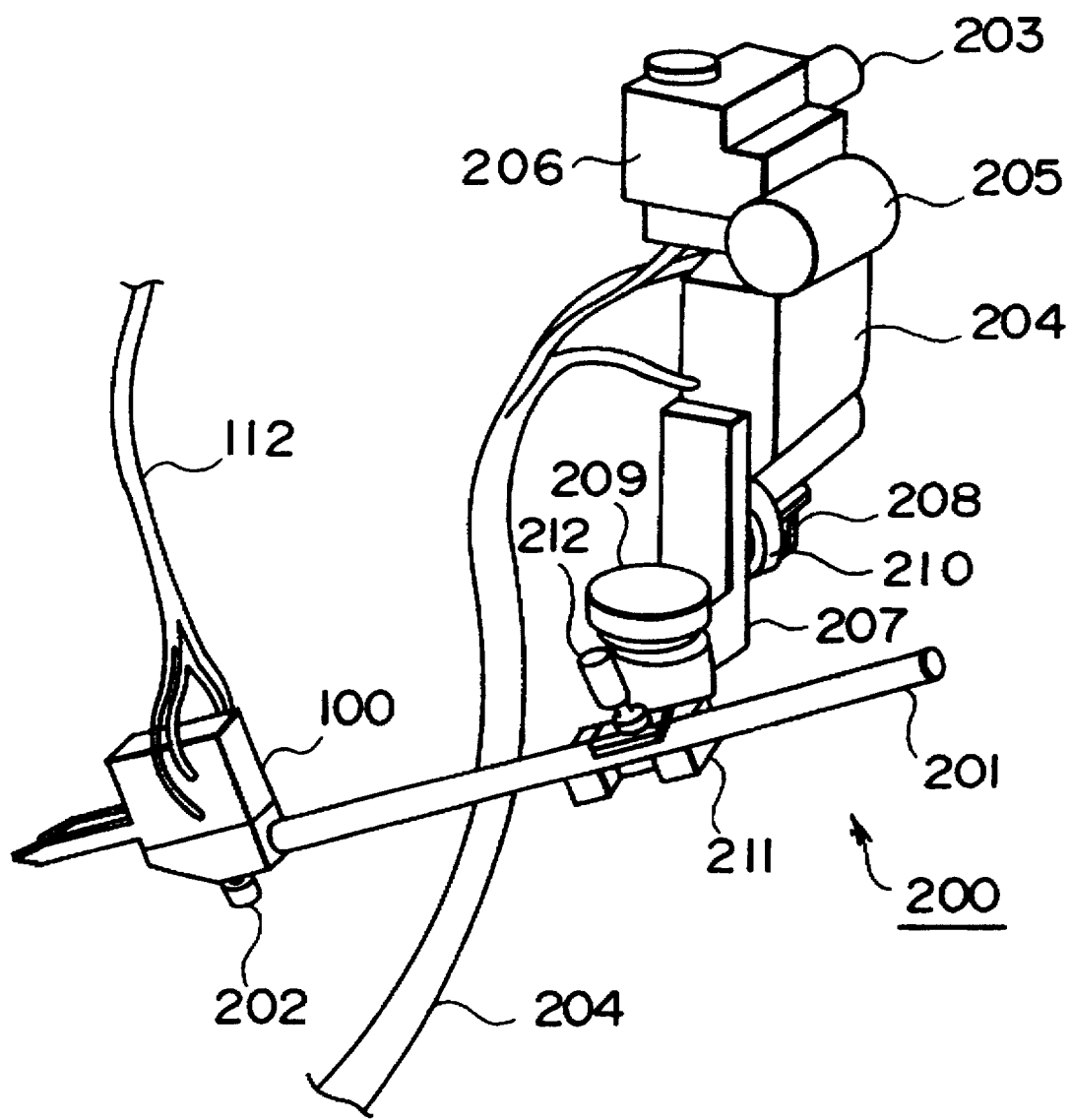
FIG. 3 is a perspective view to schematically show the configuration of the micromanipulator equipped with the microgripper of FIG. 2.

As shown in FIG. 3, the microgripper 100 is mounted by a securing screw 202 at the tip of a driving bar 201 supported by the micromanipulator 200. The micromanipulator 200 is installed through a connecting bar 203 on a coarse drive apparatus, not shown, fixed near the stage 310 and positions the microgripper 100 near the microscopic body 300 as an operated object.

The micromanipulator 200 is a three-dimensional micromanipulator of a hydraulic drive remote operating method and, based on a hydraulic control signal transmitted in a remote fashion through a hydraulic conductor cable 204 from the master input apparatus 10, the whole of the micromanipulator 200 is three-dimensionally and finely moved relative to the microscopic body 300 in a cubic space of about 5 mm×5 mm×5 mm.

In the micromanipulator 200, a drive unit for driving in the coordinate directions of X, Y, and Z is composed of two horizontal drive units 204, 205 for driving along the X-axis direction and the Y-axis direction and a vertical drive unit 206 for driving along the Z-axis direction. When the master input apparatus 10 is set in the right hand operation condition, the two horizontal drive units 204, 205 drive along the X-axis direction and the Y-axis direction, respectively; whereas, when the master input apparatus 10 is set in the left hand operation condition, the two horizontal drive units 204, 205 drive along the Y-axis direction and the X-axis direction, respectively.

In the drive unit of the micromanipulator 200 a ball joint 207 is fixed by a fixing mechanism 208 of a combination of a male screw with a female screw, threaded in a V-shape. A rotating portion of the ball joint 207 is fixed by a securing screw 209 and a sliding portion of the ball joint 207 by a securing screw 210. A holder 211 jointed to the ball joint 207 secures the base of the driving bar 201 by a securing screw 212 and transmits the drive of the horizontal and vertical drive units 204 to 206 through the driving bar 201 to the microgripper 100.

Figure 4:
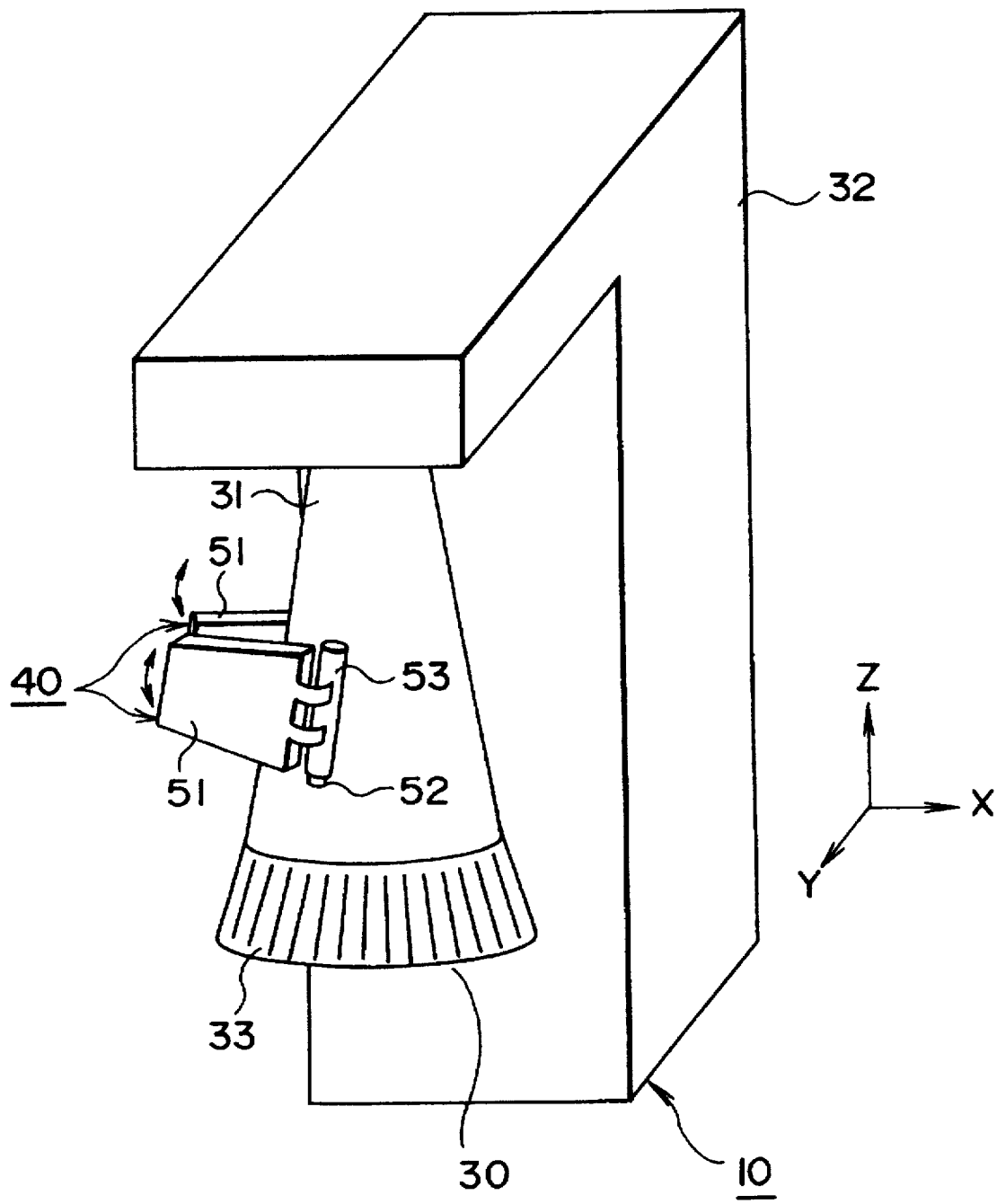
FIG. 4 is a perspective view to schematically show the configuration of the master input apparatus mounted in the microgripper system of FIG. 1.

As shown in FIG. 4, the master input apparatus 10 is provided with a joystick apparatus 30 having a movable joystick 31 and generating a movement control signal to be output to the micromanipulator 200 in accordance with movement of the joystick 31 operated by the hand of the operator, and a finger operating apparatus 40 disposed on the joystick 31, for generating an opening and closing control signal to be output to the microgripper 100 in accordance with an operation by the operator's hand gripping the joystick 31.

In the joystick apparatus 30 the joystick 31 is arranged as inclinable on the support body 32 fixed at the predetermined position. Namely, the top end of the joystick 31 is supported on the bottom of an overhang on the top side of the support body 32 so that the joystick 31 may be inclinable in any direction on the XY plane (the horizonal plane). In the bottom part of the joystick 31 a rotary dial 33 is set as rotatable about the axis along the longitudinal direction of the joystick 31.

Inside the joystick 31, support 32, and rotary dial 33, an injection mechanism is disposed for supplying as a signal generating portion to the micromanipulator 200 of a three-dimensional hydraulic drive manipulator, hydraulic signals according to an amount of displacement of a piston to which a moving position of the joystick 31 relative to the support body 32 and a rotational position of the rotary dial 33 relative to the joystick 31 are transmitted. In more detail, a hydraulic signal according to an amount of inclination of an X-directional component of the joystick 31 is supplied as an X-directional (horizontal) movement control signal from the injection mechanism to the microcomputer 200, a hydraulic signal according to an amount of inclination of a Y-directional component of the joystick 31 is supplied as a Y-directional (horizontal) movement control signal from the injection mechanism to the micromanipulator 200, and a hydraulic signal according to the rotational position of the rotary dial 33 comprising a potentiometer or encoder is supplied as a Z-directional (vertical) movement control signal from the injection mechanism to the micromanipulator 200.

Hence, the user can move the whole of the microgripper 100 through the micromanipulator 200 to a position of desired X, Y, Z coordinates by inclining the joystick 30 and rotating the rotary dial 33.

The injection mechanism applicable as the joystick device 30 may be, for example, one of commercially available products from Nikon, called "suspension joystick three-dimensional hydraulic micromanipulator MO-388" and "suspension joystick three-dimensional hydraulic micromanipulator MO-188."

As shown in FIG. 4, the finger operating apparatus 40 is composed of two systems of operation moving portions and signal generating portions corresponding to the pair of finger portions 102, 103 of the microgripper 100. The two sets of the operation moving portions and signal generating portions are constructed in the same configuration, and are opposed to each other near the side surface of the joystick 31. Each operation moving portion is a protruding lever 51 movable relative to the joystick 31, which is hinged on the joystick 31. Each signal generating portion is a rotary potentiometer 52 for generating an opening and closing control signal according to movement of the protruding lever 51 relative to the joystick 31. It is noted that the rotary potentiometer 52 may be replaced by a rotary encoder or the like.

Figure 5:
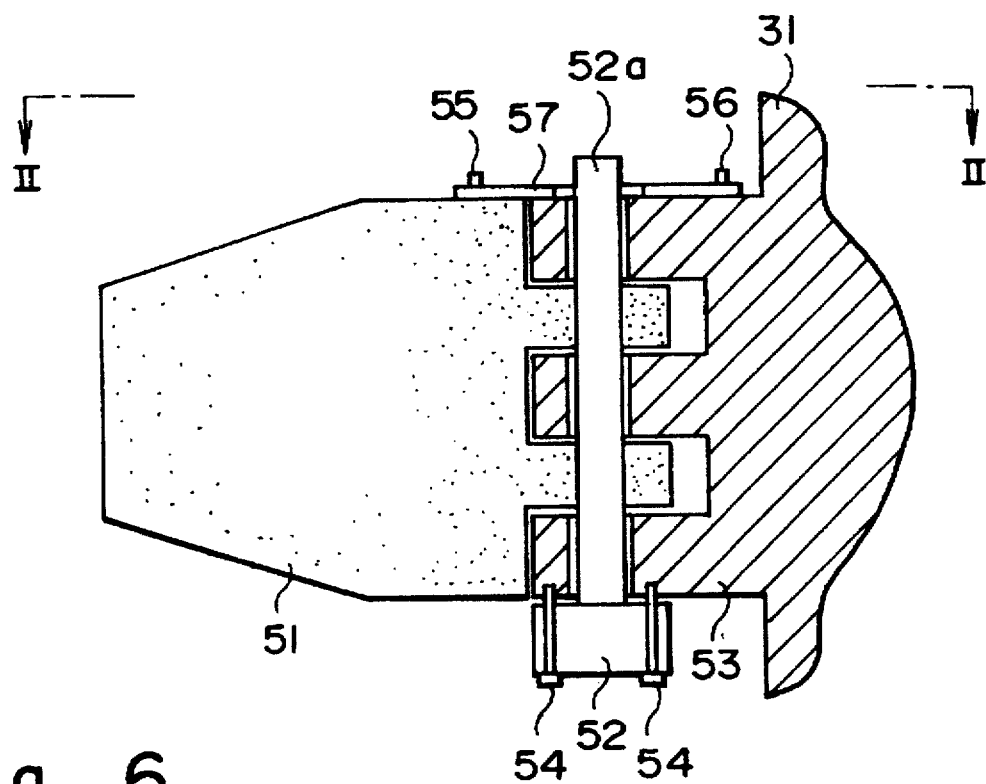
FIG. 5 is a sectional view to show the structure of the finger operating apparatus set in the master input apparatus of FIG. 4.

As shown in FIG. 5, an input rod 52a of the rotary potentiometer 52 is fixed to the protruding lever 51 so as to serve as a rotating shaft of the hinge in the operation moving portion. Namely, a receiving member 53 having a jagged portion for hinge at the tip is projecting from the surface of the joystick 31. The protruding lever 51 has a jagged portion for hinge at the base in correspondence to the receiving member 53. While the jagged portion of the receiving member 53 meshes with the jagged portion of the protruding lever 51, the input rod 52a is fit in a through hole formed in communication at the projections of the receiving member 53 and the projections of the protruding lever 51. This arrangement keeps the input rod 52a stationary relative to only the protruding lever 51 but rotatable relative to the receiving member 53.

Figure 6:
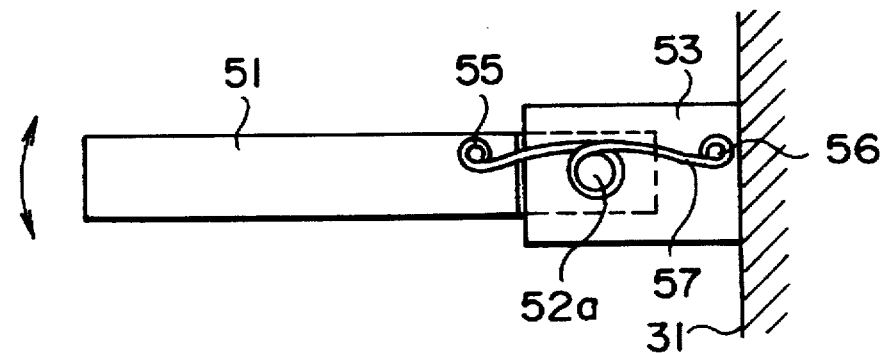
FIG. 6 is a side view to show the configuration of the finger operating apparatus, taken along the line II—II and observed along the arrows in FIG. 5.

As shown in FIG. 5 and FIG. 6, the potentiometer 52 is fixed to the side of the receiving member 53 by two screws 54. Two pins 55, 56 project near the hinge as described above on the side of the protruding lever 51 and on the side of the receiving member 53, respectively. A return spring 57 is hooked on these pins 55, 56 and input rod 52a, so that the protruding lever 51 returns to a predetermined position relative to the joystick 31 by elastic force of the return spring 57. The reason why the two sets of operation moving portions and signal generating portions in the finger operating device are positioned on the side of the joystick 31 is that the two protruding levers 51 should be opposed to each other with a predetermined gap from each other when the two protruding levers 51 return to the predetermined positions.

Figure 7:
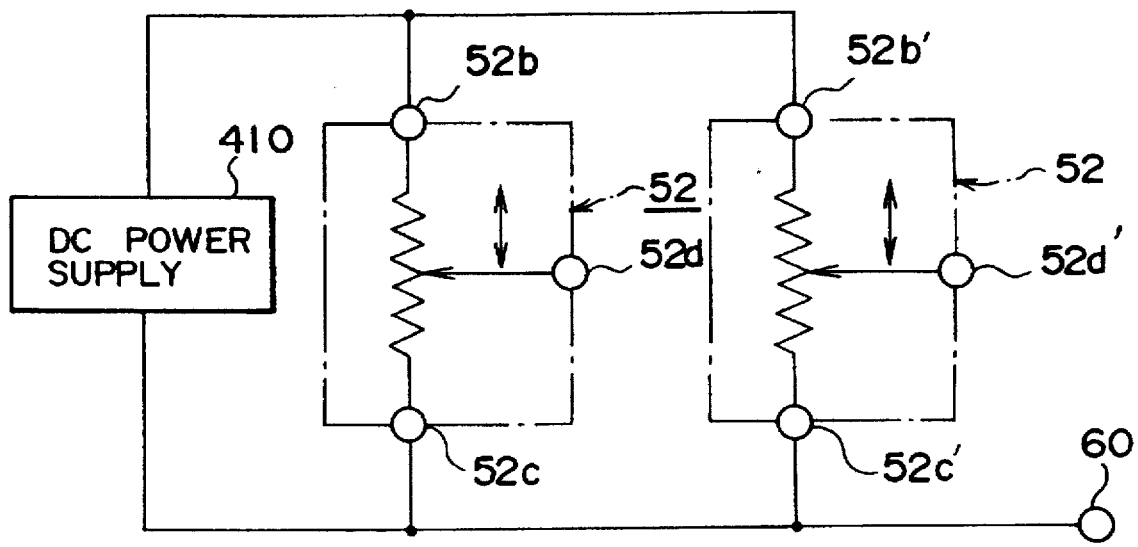
FIG. 7 is a circuit diagram to show a setup of a drive circuit included in the finger operating apparatus shown in FIG. 5 and FIG. 6.

Here, the two individual potentiometers 52 as described above are re-denoted as one potentiometer 52 and the other potentiometer 52' corresponding thereto, for convenience' sake of explanation. As shown in FIG. 7, these two potentiometers 52, 52', together with the dc power supply 59, compose a drive circuit for supplying an opening and closing control signal to the computer 400, in order to make the dc power supply 410 output a drive signal to the microgripper 100.

One-side terminals 52b, 52b' of resistors in the two rotary potentiometers 52, 52' are connected to the output terminal of one polarity of the dc power supply 410. Other-side terminals 52c, 52c' of the resistors in the two rotary potentiometers 52b, 52b', and a terminal 60 for electrical connection to the outside are connected to the output terminal of the other polarity of the dc power supply 410.

As shown in FIG. 3, the terminal 60 is connected through the computer 400 by the conductor cable 112 to the electrode pad 107 of the finger portion 102 and the electrode pad 108 of the finger portion 103 in the microgripper 100, a terminal 52d of a movable contact of the potentiometer 52 is connected through the computer 400 by the conductor cable 112 to the electrode pad 108 of the finger portion 102, and a terminal 52d' of a movable contact of the potentiometer 52' is connected through the computer 400 by the conductor cable 112 to the electrode pad 107 of the finger portion 103. The positions of the movable contacts of the two potentiometers 52, 52' each change depending upon the rotational position of the input rod 52a.

Accordingly, the rotational position of the input rod 52a of each of the two potentiometers 52, 52' changes depending upon the position of each of the two protruding levers 51, an electric current in the ampere according to the position thereof flows through the coil layer 106 of each of the pair of fingers 102, 103 in the microgripper 100, the Lorentz force occurs in the magnitude according to the ampere of the electric current, and each of the pair of fingers 102, 103 is bent depending upon the magnitude of the Lorentz force. Consequently, bending amounts of the pair of fingers 102, 103 are determined depending upon the positions of the two protruding levers 51.

The user can open and close the pair of finger portions 102, 103 by manipulating the two protruding levers 51, as described above. When the user looses his hold of the two protruding levers 51, the two protruding levers 51 open because of the returning force of the return springs 57, and no electric current flows in the coil layers 106 of the pair of finger portions 102, 103 to open the pair of finger portions 102, 103.

With the master input apparatus 10 as explained above, the user, while observing the motion of the microgripper 100 relative to the microscopic body 300 in the microscopical image displayed on the monitor device 350 through the microscope apparatus 330 and the image pickup device 340, can open and close the two protruding levers 51 by the index finger and the thumb of one hand, rotate the rotary dial 33 is by its little finger, and incline the joystick 31 by the middle finger, the third finger, and the palm, so that the user can carry out both the moving operation of the whole of the microgripper 100 and the opening and closing operation of the finger portions 102, 103 of the microgripper 100 by one hand.

Figure 8:
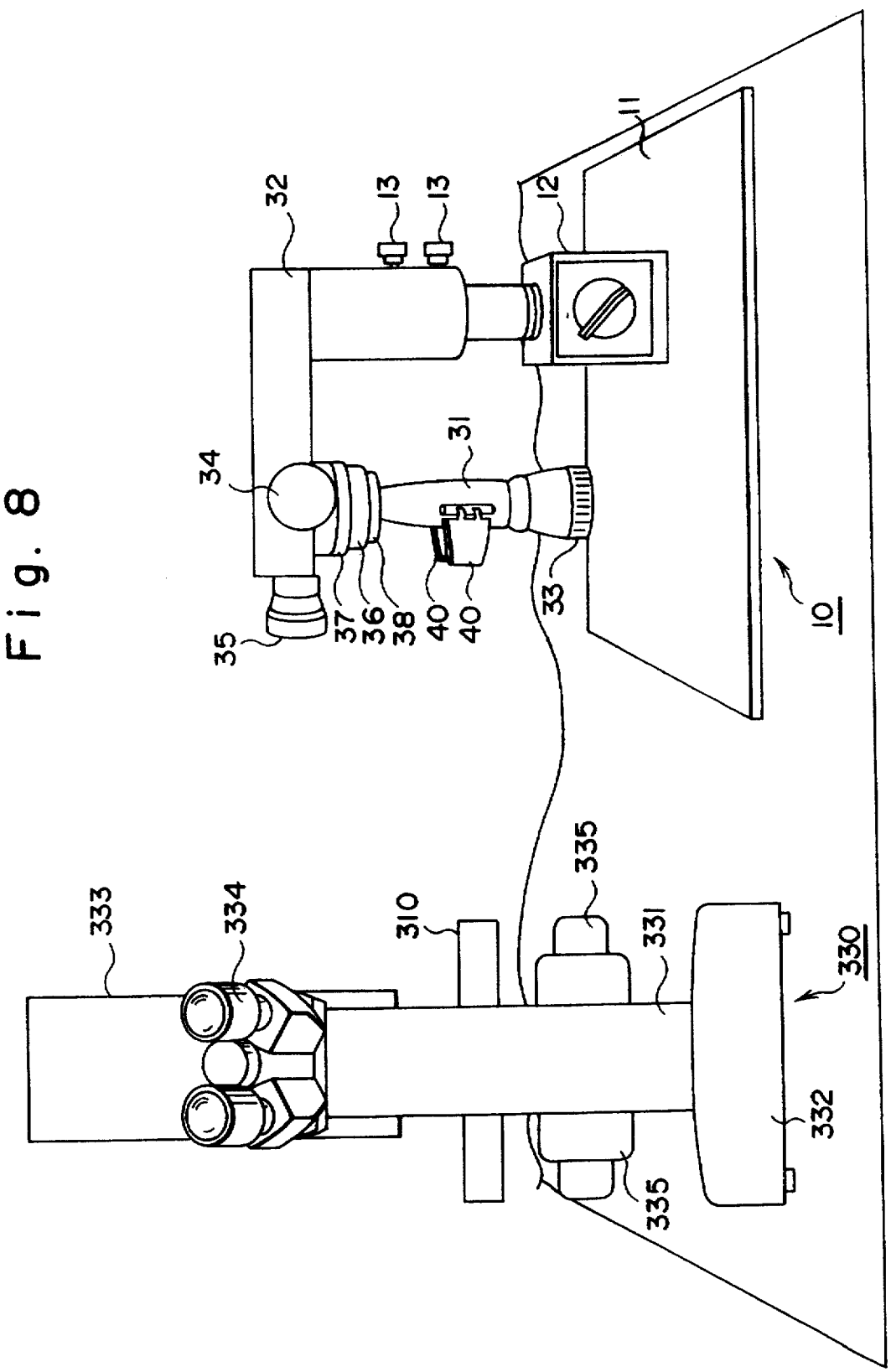
FIG. 8 is a drawing to show a state in which the master input apparatus and microscope apparatus are set near the operator in the microgripper system of FIG. 1.

As shown in FIG. 8, the master input apparatus 10 is set near the microscope apparatus 330. In the master input apparatus 10, the lower end of the support body 32 is fixed to the surface of a surface plate 11 by a magnet stand 12 and the height of the support body 32 is adjusted by two adjuster screws 13 at the height where the user can readily manipulate the apparatus. The joystick 31 and rotary dial 33 together are supported on a beam of the support body 32, and two rotary dials 34, 35 are rotatably set on the rotational axes perpendicular to each other. Hydraulic signals corresponding to positions of rotation of these two rotary dials 34, 35 are supplied as X-directional and Y-directional movement control signals from the injection mechanism to the micromanipulator 200.

When the master input apparatus 10 is set in the right hand operation condition, the rotary dial 34 is opposed to the user. Thus, the rotary dial 34 is a handle for driving the micromanipulator 200 along the X-axis direction while the rotary dial 35 is a handle for driving the micromanipulator 200 along the Y-axis direction. When the master input apparatus 10 is set in the left hand operation condition on the contrary, the rotary dial 35 is opposed to the user. Thus, the rotary dial 34 is a handle for driving the micromanipulator 200 along the Y-axis direction while the rotary dial 35 a handle for driving the micromanipulator 200 along the X-axis direction.

At the base part of the joystick 31 a movable-ratio adjusting handle 36, a fixing handle 37, and a lever smoothness adjusting handle 38 are arranged as concentrically rotatable about the rotational axis of the longitudinal axis of the joystick 31. A ratio of a motion of the manipulator 200 to a motion of the joystick 31 is set corresponding to a rotational position of the movable-ratio adjusting handle 36 fixed by the fixing handle 37. Lever smoothness of the joystick 31 is set corresponding to a rotational position of the lever smoothness adjusting handle 38.

In the microscope apparatus 330 set near the master input apparatus 10, a stand 331 is fixed on a pedestal 332. This stand 331 supports a stage 310 for holding the microscopic body 330, and a barrel 333 including an objective optical system opposed to the microscopic body 330 and having an external eyepiece optical system 334 for enabling naked-eye observation of microscopical image.

A focus adjusting handle 335 projects out from the side faces of the stand 331. The position of the barrel 333 relative to the stand 331 is set corresponding to a rotational position of the focus adjusting handle 335, so that the position of the focal plane of the objective optical system included in the barrel 333 is adjusted relative to the microscopic body 300 located on the stage 310.

Since the master input apparatus 10 and microscope apparatus 330 are set close to each other as described, the user can adjust the focus condition of the microscope image to the best focus condition as observing the image through the eyepiece optical system 334 or on the monitor device 350 by manipulating the focus adjusting handle 335 of the microscope apparatus 330 by one hand and can smoothly carry out movement of the microgripper 100 relative to the microscopic body 300 by manipulating the joystick 31 and the finger operating apparatus 40 of the master input apparatus 10 by the other hand.

Figure 9:
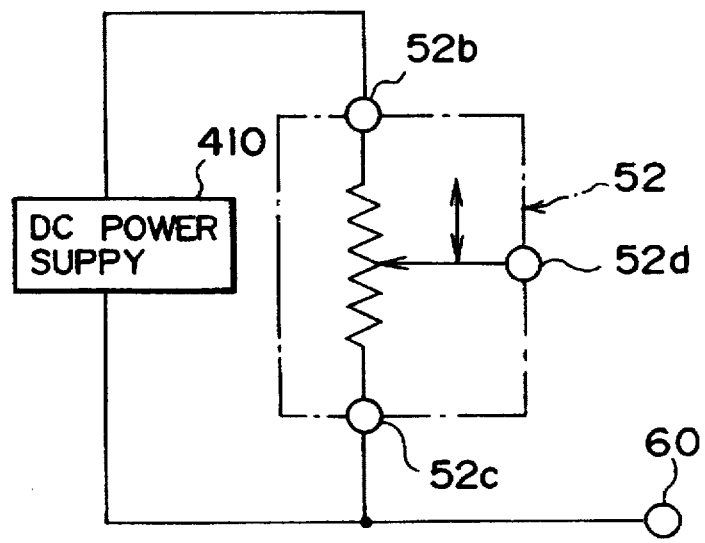
FIG. 9 is a circuit diagram to show a setup of a modification of the drive circuit of FIG. 7.

The finger operating apparatus 40 included the dual-system signal generating portions in the master input apparatus 10 as described, but one of them may be omitted. In this case, for example, the drive circuit shown in FIG. 9 may be used instead of the drive circuit of the pair of finger portions 102, 103 of the microgripper 100 as shown in FIG. 7. The drive circuit shown in FIG. 9 is different from the drive circuit shown in FIG. 7 only in that the potentiometer 52' is omitted. The terminal 60 of the drive circuit is connected through the computer 400 and the dc power supply 410 to the electrode pad 107 of the finger portion 102 and the electrode pad 108 of the finger portion 103 in the microgripper 100, and the terminal 52d of the movable contact of the potentiometer 52 is connected through the computer 400 and the dc power supply 410 to the electrode pad 108 of the finger portion 102 and the electrode pad 107 of the finger portion 103. In this case, when one protruding lever 51 is operated, the both of the pair of finger portions 102, 103 operate to open and close.

The joystick apparatus 30 is not limited to the above configuration, but may be, for example, of an upright type instead of the suspension type; that is, it may be one in which the lower end of the joystick 31 is supported on the top of the support 32. Potentiometers or encoders, which generate movement control signals of electric signals instead of the hydraulic signals, may be employed for the signal generating portions of the joystick apparatus 30. In this case the drive unit of the micromanipulator 200 may be an electric pulse motor instead of the hydraulic drive motor.

The output signals of the two potentiometers 52, 52' were used as the opening and closing control signals for the microgripper 100 at the computer 400 controlling the dc power supply 410, but the opening and closing signals for the microgripper 100 may be directly used as drive signals for the microgripper 100.

Second Embodiment

The microgripper system of the present embodiment is constructed substantially in the same arrangement as the first embodiment as described above, but is different from that of the above first embodiment only in the master input apparatus.

Figure 10:
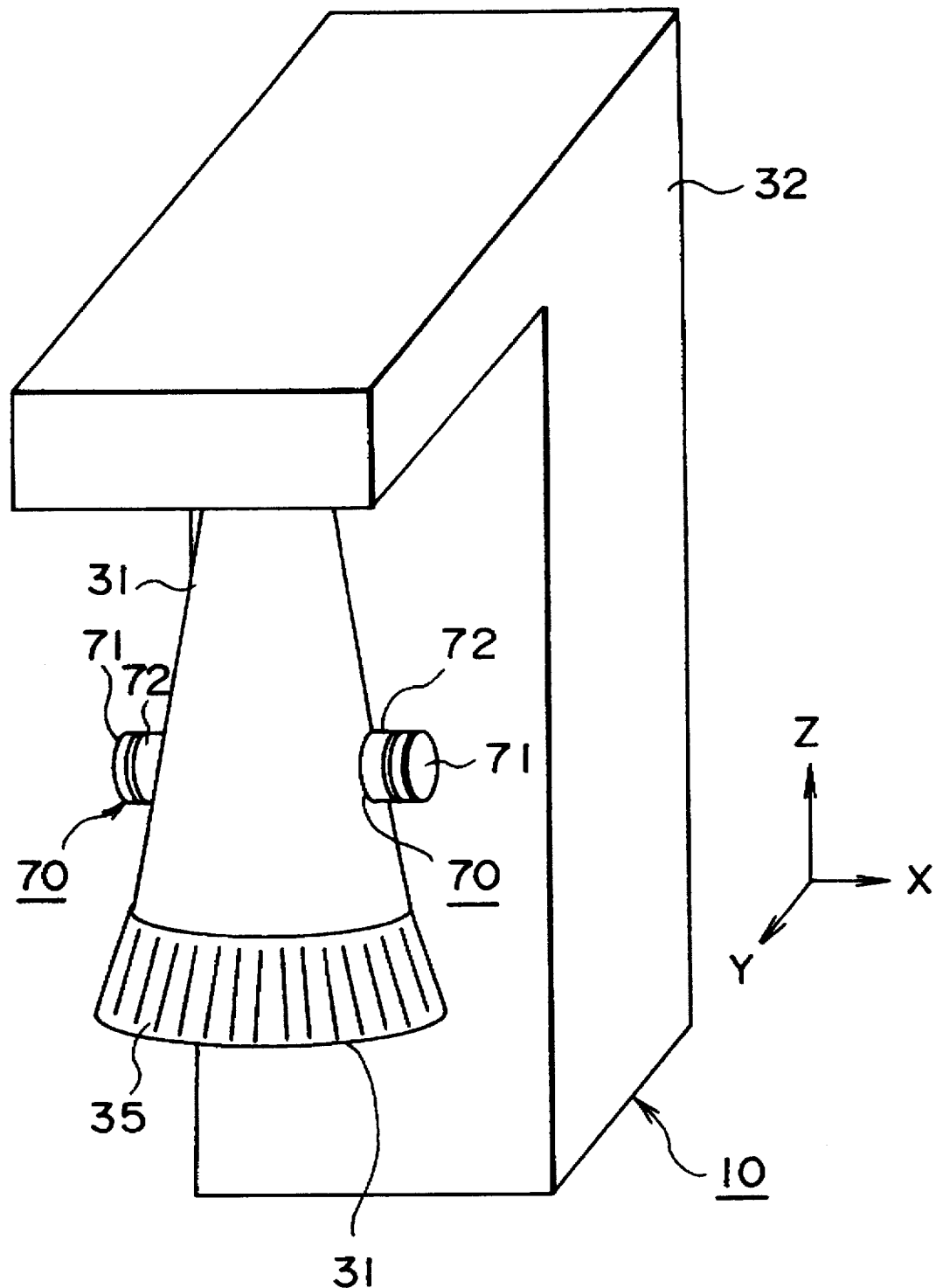
FIG. 10 is a perspective view to schematically show the configuration of the master input apparatus mounted in the second embodiment associated with the microgripper system according to the present invention.

As shown in FIG. 10, the master input apparatus 10 of the present embodiment is different from the master input apparatus 10 of the above first embodiment only in that, in place of the finger operating apparatus 40, the present embodiment uses the finger operating apparatus 70 set on the joystick 31, for generating opening and closing control signals for opening and closing the pair of finger portions 102, 103 of the microgripper 100 in accordance with manipulation of the user's hand gripping the joystick 31.

This finger operating apparatus 70 is also composed of two systems of operation moving portions and signal generating portions corresponding to the two finger portions 102, 103 of the microgripper 100. The two operation moving portions and two signal generating portions are formed in the same configuration, and are set as opposed to each other near the side surface of the joystick 31. Each operation moving portion is a button switch 71 movable relative to the joystick 31, which is arranged as telescopically movable relative to the joystick 31. Each signal generating portion is a direct-acting potentiometer 72 for generating an opening and closing control signal according to movement of the button switch 71 relative to the joystick 31. The direct-acting potentiometers 72 may be replaced by direct-acting encoders or the like.

Figure 11:
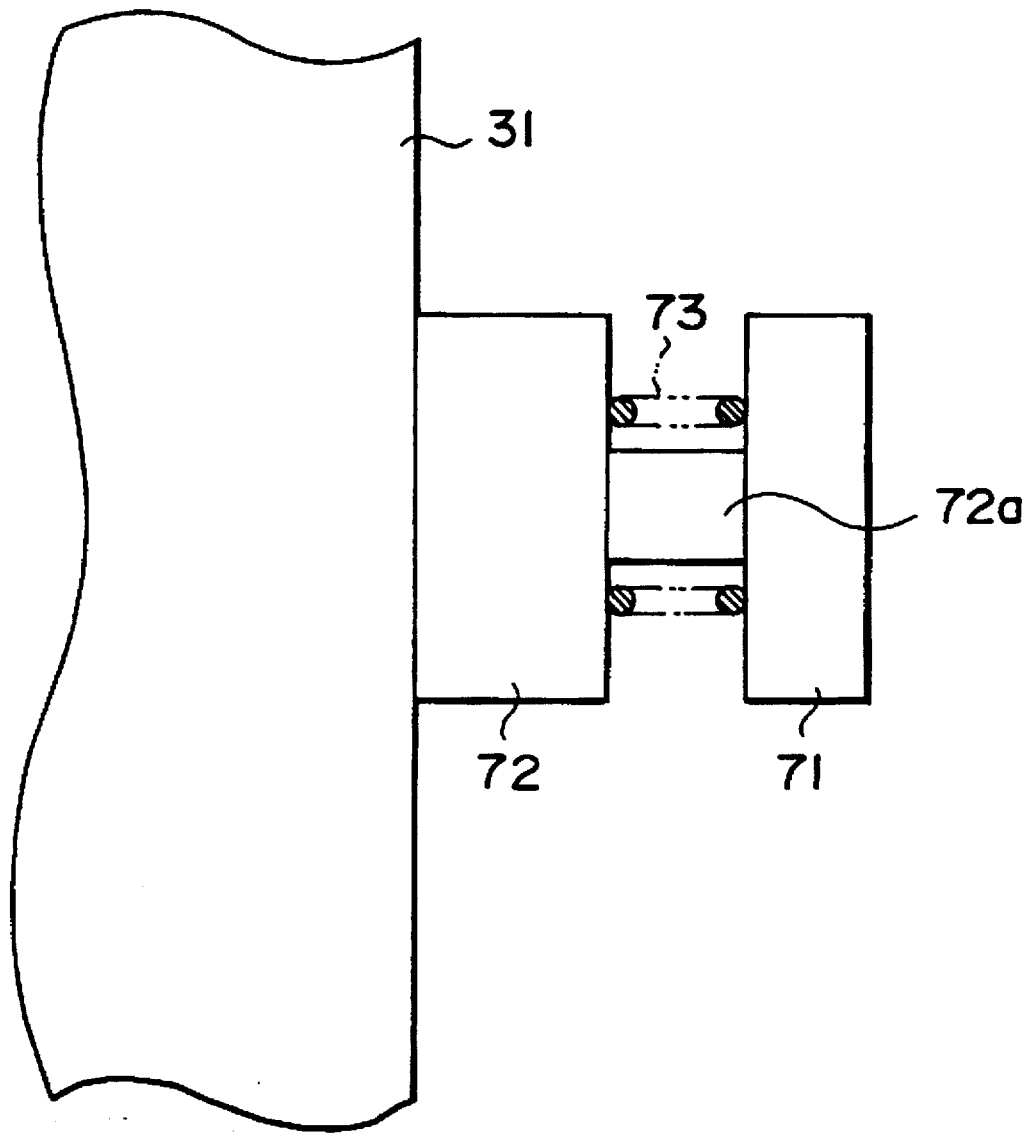
FIG. 11 is a sectional view to show the structure of the finger operating apparatus set in the master input apparatus of FIG. 10.

As shown in FIG. 11, the main bodies of the two potentiometers 72 are fixed at facing positions on the side surface of joystick 31, and a button member 71 is fixed at the tip of an input rod 72a of each potentiometer 72. A return spring 73 for returning the button switch 71 to a return position projected from the main body of potentiometer 72 is set between the button switch 71 and the main body of potentiometer 72. These two potentiometers 72 permit the drive circuit for supplying the opening and closing control signals to the computer 400 to be formed in the same configuration as in the above first embodiment.

In the master input apparatus 10 as described, an electric current in the ampere according to a pushing amount of the button switch 71 flows in the coil layer 106 of each of the pair of finger portions 102, 103 in the microgripper 100, the Lorentz force appears in the magnitude according to the ampere of the electric current, and the pair of finger portions 102, 103 are bent according to the magnitude of the Lorentz force. As a result, bending amounts of the pair of finger portions 102, 103 are determined according to pushing amounts of the two button switches 71.

Hence, the user can open and close the pair of finger portions 102, 103 by manipulating the two button switches 71. When the user looses his hold of the two button switches 71, the returning force of the return springs 73 returns the two button switches 71 to the original positions and no electric current flows in the coil layers 106 of the pair of finger portions 102, 103 to open the pair of finger portions 102, 103.

With the master input apparatus 10 as explained above, the user can manipulate the two button switches 71 by the index finger and the thumb of one hand or only by the index finger, rotate the rotary dial 33 by the little finger, and incline the joystick 31 by the middle finger, third finger, and palm, so that the user can perform both the moving operation of the whole of the microgripper 100 and the opening and closing operation of the finger portions 102, 103 of the microgripper 100 by one hand.

The finger operating device 70 included the dual-system signal generating portions in the master input apparatus 10 similarly as in the above first embodiment, but one of them may be omitted.

Third Embodiment

The microgripper system of the present embodiment is formed substantially in the same arrangement as the above first embodiment, but is different from that of the above first embodiment only in the master input apparatus.

Figure 12:
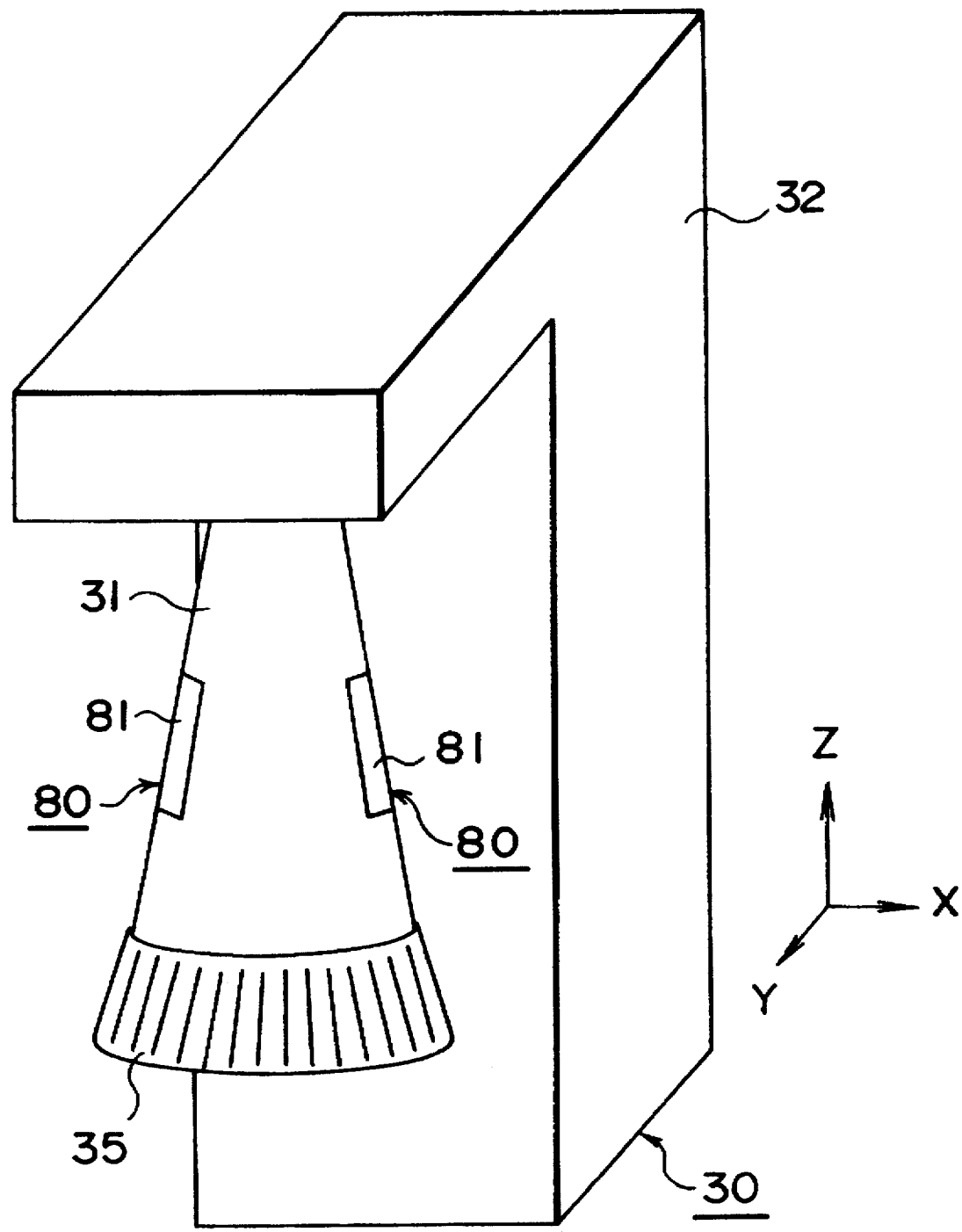
FIG. 12 is a perspective view to schematically show the configuration of the master input apparatus mounted in the third embodiment associated with the microgripper system of the present invention.

As shown in FIG. 12, the master input apparatus 10 of the present embodiment is different from the master input apparatus 10 of the above first embodiment only in that the finger operating apparatus 40 is replaced by the finger operating apparatus 80 mounted on the joystick 31, for generating the opening and closing control signals for opening and closing the pair of finger portions 102, 103 of the microgripper 100 in accordance with the operation of the user's hand gripping the joystick 31.

This finger operating device 80 is also constructed of two systems of signal generating portions corresponding to the two finger portions 102, 103 of the microgripper 100. The dual-system signal generating portions are formed in the same configuration and are set as opposed to each other near the side surface of the joystick 31. Each signal generating portion is formed of a piezoelectric device 81 as a piezoelectric converter for generating an opening and closing control signal according to a pressure applied thereto by the operator.

Figure 13:
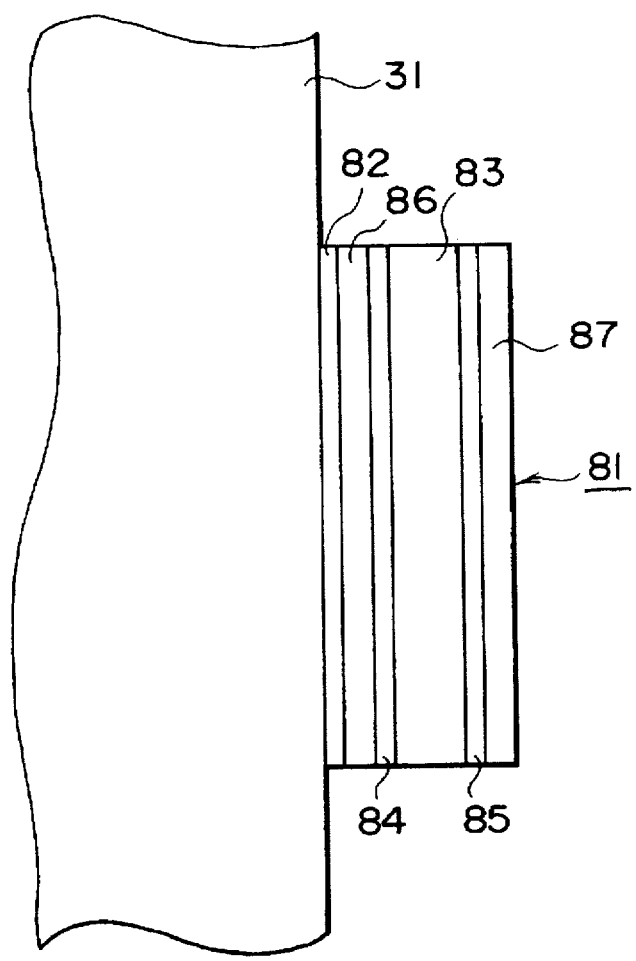
FIG. 13 is a sectional view to show the structure of the finger operating apparatus set in the master input apparatus of FIG. 12.

As shown in FIG. 13, the two piezoelectric devices 81 are bonded with an adhesive 82 at facing positions on the side surface of the joystick 31. Each piezoelectric device 81 is composed of a piezoelectric layer 83, two electrode layers 84, 85 formed on the both sides of the piezoelectric layer 83, and insulating protection layers 86, 87 formed outside the electrode layers 84, 85.

Figure 14:
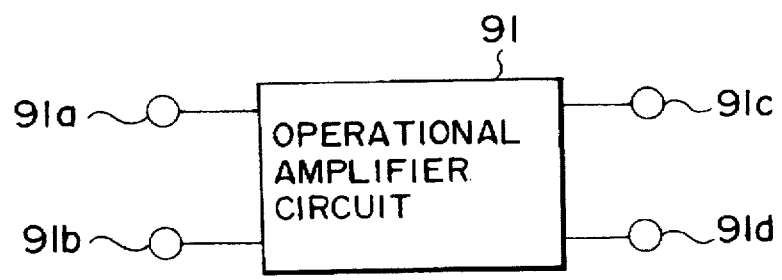
FIG. 14 is a circuit diagram to show a setup of a drive circuit included in the finger operating apparatus of FIG. 13.

As shown in FIG. 14, these two piezoelectric devices 81 are associated with the drive circuit for supplying the opening and closing control signals to the computer 400, which is comprised of an operational amplifier circuit 91. Namely, input terminals 91a, 91b of the operational amplifier circuit 91 are connected to the electrode layers 84, 85, respectively, of the piezoelectric device 81, and output terminals 91c, 91d of the operational amplifier circuit 91 are connected to the electrode pads 107, 108 of the finger portion 102 of the microgripper 100.

The same operational amplifier circuit 91 can be applied to the drive circuit for the finger portion 102 and the drive circuit for the other finger portion 103. This operational amplifier circuit 91 also has a function to convert a nonlinear voltage characteristic obtained from the piezoelectric device 81 against the pressure applied into a desired characteristic, in addition to the amplifying function.

With the master input apparatus 10 as described, an electric current in the ampere according to the pressing force on the piezoelectric device 81 flows in the coil layer 106 of each of the pair of finger portions 102, 103 in the microgripper 100, the Lorentz force appears in the magnitude according to the ampere of the electric current, and the pair of finger portions 102, 103 are bent according to the magnitude of the Lorentz force. As a result, bending amounts of the pair of finger portions 102, 103 are determined according to the pressing force on the two piezoelectric devices 81.

Hence, the user can open and close the pair of finger portions 102, 103 by changing the pressing force on the two piezoelectric devices 81, that is, by changing the gripping force of the joystick 31. When the user looses his hold of the two piezoelectric devices 81, the pressing force is eliminated from the two piezoelectric devices 81 and no electric current flows in the coil layers 106 of the pair of finger portions 102, 103 to open the pair of finger portions 102, 103.

With the master input apparatus 10 as explained above, the user can apply the gripping force onto the piezoelectric devices 81 by the index finger and the thumb of one hand or only by the index finger, rotate the rotary dial 33 by the little finger, and incline the joystick 31 by the middle finger, third finger, and palm, so that the user can perform both the moving operation of the whole of the microgripper 100 and the opening and closing operation of the finger portions 102, 103 of the microgripper 100 by one hand.

The finger operating device 80 was comprised of the dual-system signal generating portions in the master input apparatus 10, similarly as in the above first embodiment, but one of them can be omitted.

Fourth Embodiment

The microgripper system of the present embodiment is formed substantially in the same arrangement as the above first embodiment, but is different from that of the above first embodiment only in the microgripper 100.

Figure 15:
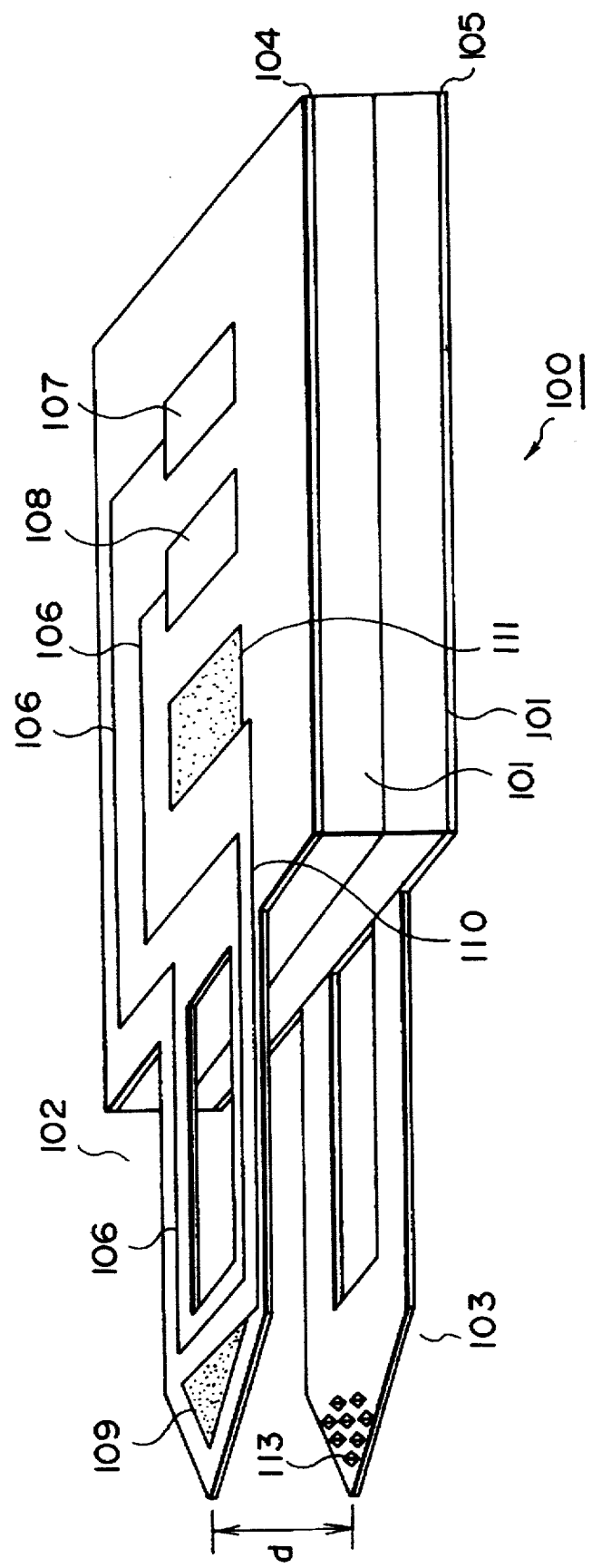
FIG. 15 is a perspective view to schematically show the configuration of the microgripper mounted in the fourth embodiment associated with the microgripper system of the present invention.

As shown in FIG. 15, the microgripper 100 of the present embodiment is different from the microgripper 100 of the above first embodiment only in that a plurality of projections 113 are formed as holding portions for capturing at the tip portions of the two finger portions 102, 103 so as to prevent the microscopic body 300 as a gripped object from readily slipping off when gripped. The plurality of projections 113 may be formed in such a shape as to match with the microscopic body 300 as a gripped object.

A process for fabricating the microgripper 100 is explained in the following.

In this case the pair of finger portions 102, 103 are formed of silicon nitride films and the support substrate 101 is formed of silicon. Namely, by the low pressure vapor phase epitaxy a silicon nitride film is formed in 250 nm from raw materials of dichlorosilane and ammonia gas on an n-type silicon substrate 101 of the diameter 3 inches, the thickness 250 μm, and the plane orientation (100).

Next, the silicon nitride film on the substrate 101 is partially removed by the photolithography process and dry etching process in order to form the holding portions for capturing in the finger portion 102, 103. Here, the removal is effected to form five to fifteen projections 113 at the tip portion of the finger portion 102, 103 having a shape of about 5 μm to 10 μm square. The shape, size, and number of these projections may be arbitrarily determined depending upon the object to be gripped.

After that, the substrate 101 is immersed in a silicon etchant, for example a potassium hydroxide (KOH) solution or a tetramethyl ammonium hydroxide (TMAH) solution, so as to etch silicon portions exposed from the silicon nitride film in a square pyramid to form a plurality of recesses. Then a silicon nitride film is again formed in 250 nm over the entire surface of the substrate 101 by the low pressure vapor phase epitaxy. The silicon nitride film has the projecting shape at the portions of recesses of silicon. Thus, the projections 113 are formed in the projecting shape as the holding portions for capturing on the finger portion 102, 103. Using the same process, the holding portions for capturing can also be formed in a recessed shape.

This substrate 101 is subjected to the dry etching process with a resist film as a protection layer to remove unnecessary portions of the silicon nitride film, thereby forming the finger portion 102, 103 in a hollow shape in the length of 600 μm and in the width of 120 μm. The two finger portions 102, 103 may be formed in an arbitrary shape in this case, and they do not always have to be formed in the hollow shape.

Next, a resist film is formed in the thickness 1 μm by the photolithography process, and patterning is made in the shape of the metal plate 109, coil layer 106, wiring layer 110, and three electrode pads 107, 108, 111. Then a film of NiCr is formed in the thickness 1 nm by vacuum vapor deposition, and a film of Au is next formed in the thickness 49 nm over the entire surface. The reason why the double layer films are formed is that NiCr with strong adhesion to silicon nitride needs to be first formed because Au has weak adhesion to silicon nitride. Although the double layer films were used in this example, a single layer film can also be applicable, of course.

The materials for the metal film are not limited to the above, and a preferred material is one having strong adhesion to the material for the two finger portions 102, 103, i.e., to silicon nitride, small resistance, and high alkali resistance. This is because a film with weak adhesion is easily peeled off, a film with large resistance makes an electric current reluctant to flow, and a film with low alkali resistance is etched together with the material for the support substrate 101, which is silicon, when etched. Next, this sample is immersed in acetone in an ultrasonic cleaner to remove unnecessary resist and metal film portions in order to obtain necessary metal patterns.

A portion for forming one of the two finger portions 102, 103 is etch-removed from the silicon nitride film of the back side portion of the substrate 101 after the above processes, and thereafter the whole sample is immersed in a silicon etchant such as KOH or TMAH to elute the portion for forming the one of the two finger portions 102, 103 out of the silicon region, thereby obtaining a structure having the support substrate 101 of silicon and one of the finger portions 102, 103.

Two such structures are produced and are bonded to each other by an adhesive or by anode coupling between surfaces of the two structures without metal patterns etc., thereby producing the microgripper 100. Silicon nitride was used as a material for forming the two finger portions 102, 103, but the material may be any material; for example, a similar microgripper can be obtained by forming a film of polyimide on the silicon substrate by spin coating to obtain the finger portions. The support substrate 101 is not limited to the n-type silicon, but may be made of any other material than silicon, for example, of p-type silicon.

The microgripper 100 as described above can prevent the microscopic body 300 as the gripped object gripped by the two finger portions 102, 103 from readily slipping off, by providing the tip portions of the two finger portions 102, 103 with the plurality of projections or recesses as the holding portions for capturing.

The system can detect a gap between the two finger portions 102, 103 or the gripping state of the microscopic body 300 to be gripped by the two finger portions 102, 103 by detecting an electric capacitance between the pair of metal plates 109 provided in the two finger portions 102, 103 by the capacitance sensor 420. This is because the electric capacitance between the two metal plates 109 is proportional to the area of the metal plates 109 and the dielectric constant of a medium between the metal plates 109, but is inversely proportional to the distance d between the metal plates 109, i.e., the gap between the two finger portions 102, 103.

The drive signals of the two finger portions 102, 103 can be changed depending upon the electric capacitance changing of the microgripper 100 according to the opening and closing state of the two finger portions 102, 103. For example, as the electric capacitance becomes greater, that is, as the two finger portions 102, 103 approach each other, an amplification factor of the drive signals can be decreased in the dc power supply 410 by the computer 400. This can prevent a too large drive signal from being input to the microgripper 100 even if the operator gives an over input of operation to close the two fingers through the master input apparatus 10. This can prevent the two finger portions 102, 103 from hitting each other hard or from gripping the microscopic body 300 of gripped object too strong.

If the voice generator 430 is controlled depending upon the magnitude of the electric capacitance of the microgripper 100 by the computer 400, voice, buzzer sound, or the like can be generated as changing the frequency or the amplitude, or both of the frequency and amplitude. This permits the operator to perform the gripping work as listening to the sound according to the opening and closing state of the two finger portions 102, 103 of the microgripper 100, which realizes the work with sense of presence and which permits the operator to judge whether the microgripper 100 accurately grips the microscopic body 300 of gripped object.

Further, if the reactive force generator 440 is controlled depending upon the magnitude of the electric capacitance of the microgripper 100 by the computer 400, the reactive force can be generated in the master input apparatus 10 operated by the operator. This reactive force can be generated by changing the frictional resistance necessary for the operation of the finger operating apparatus of the master input apparatus 10. For example, a greater reactive force can be generated in the master input apparatus 10 operated by the operator as the finger portions 102, 103 grip the microscopic body 300 of gripped object with stronger force. This permits the operator to sense as if he or she directly grips the gripped object of the micron order, which enables to perform the work with full of sense of presence, which was unobtainable by the conventional apparatus, and which permits the operator to judge whether the finger portions 102, 103 accurately grip the microscopic body 300 of gripped object.

If the two finger portions 102, 103 are flexible, fingers, resistors may be formed instead of the metal plates 109 and the resistance changing depending upon flexure of the flexible fingers may be detected, thereby obtaining the same effect as when the electric capacitance is employed. Desirably, the capacitance value or resistance value thus detected is displayed on the monitor device 350.

Fifth Embodiment

The microgripper system of the present embodiment is formed substantially in the same arrangement as the above first embodiment, but is different from that of the above first embodiment only in the microgripper.

Figure 16:
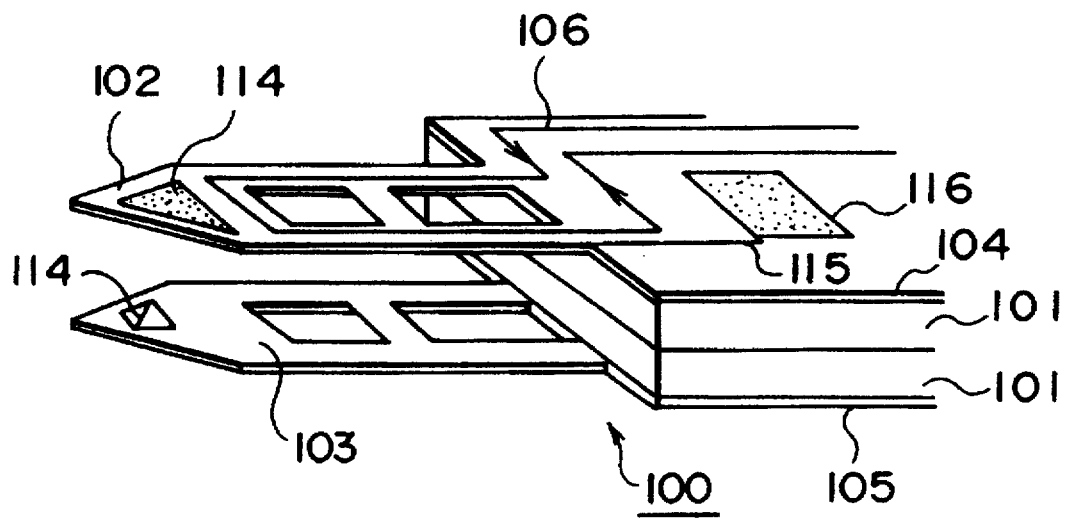
FIG. 16 is a perspective view to schematically show the configuration of the microgripper mounted in the fifth embodiment associated with the microgripper system of the present invention.
Figure 17:
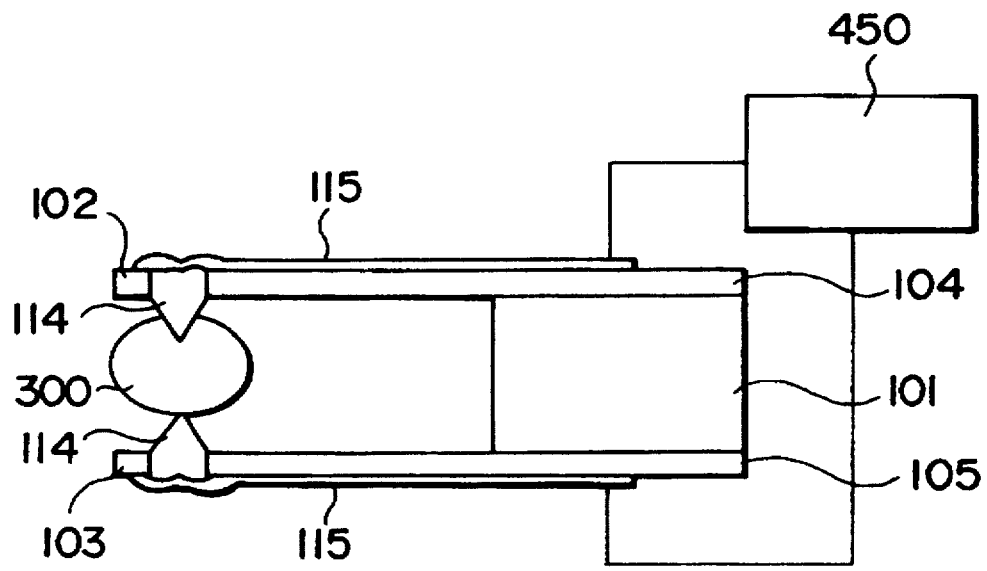
FIG. 17 is a sectional view to show the structure of the microgripper of FIG. 16.

As shown in FIG. 16 and FIG. 17, the microgripper 100 of the present embodiment is different from the microgripper 100 of the above first embodiment in that metal probes 114 are formed in a square pyramid at the tip regions of the two finger portions 102, 103 in order to measure an electrical characteristic of the microscopic body 300 of gripped object, in place of the metal plates 109. For that purpose, the probes 114 are connected through wiring layers 115 formed on the outer surfaces of the pair of finger portions 102, 103 to the electrode pads 116 for electrical connection to the outside, formed on the two silicon nitride films 104, 105 fixed on the support substrate 101.

Further, the two electrode pads 116 formed on these silicon nitride films 104, 105 are electrically connected through a measuring apparatus 450 to the computer 400. This measuring apparatus 450 detects the electrical characteristic of the measuring object 300 in contact with the probes 114 of the microgripper 110 and outputs an electric detection signal indicating various characteristic values detected to the computer 400.

A process for fabricating such a microgripper 100 is explained referring to FIG. 18A to FIG. 18E. First, prepared is a single-crystal silicon substrate 101 of the (100) plane orientation. Then dichlorosilane ($SiH_2Cl_2$) and ammonia gas ($NH_3$) are introduced as starting gases into a CVD system to form a silicon nitride ($SiN_X$) film 104 in the thickness 0.1 to 2.0 μm on the both surfaces of the substrate 101 by the vapor phase epitaxy. An insulating material containing silicon (for example, $SiO_X$ or $SiO_XN_Y$ or the like) may be used instead of silicon nitride.

Figure 18A:
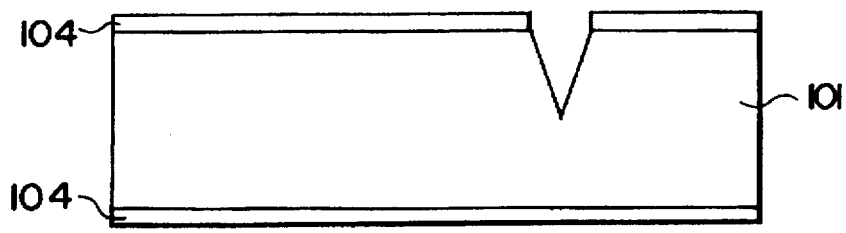
FIGS. 18A to 18E are sectional views to show a sequence of fabrication steps of the microgripper of FIG. 16.

After that, a part of the silicon nitride film 104 is removed approximately in a square shape by the dry etching process using $CF_4$, $SF_6$, or the like to form a portion exposing the surface of the silicon substrate 101. Further, anisotropic etching is carried out using the KOH solution or the like with the silicon nitride films 104 as a mask, thereby forming a recess in a square pyramid in the silicon substrate 101 (FIG. 18A).

Figure 18B:
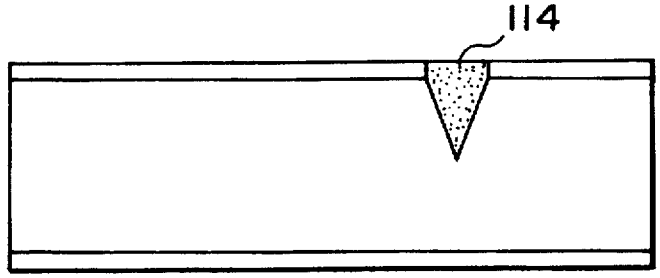

Next, tungsten hexafluoride ($WF_6$) gas is introduced as a starting gas to the CVD system and the selective CVD process applying the reduction reaction of silicon is used to deposit tungsten (W) only in the recessed portion exposing silicon of the substrate 101, thereby forming the probe 114 (FIG. 18B). The probe 114 is formed to have each bottom side of about 5 μm and the height of about 3.5 μm. The shape, size, and number of the probe 114 may be arbitrarily determined depending upon the object to be gripped.

Figure 18C:
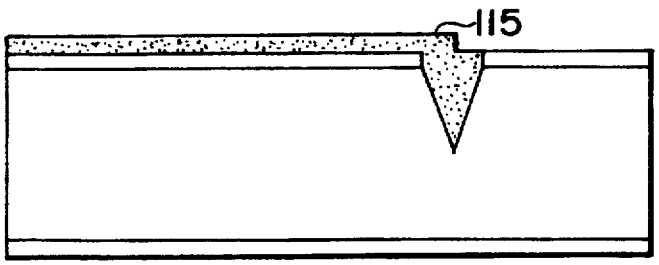

Further, a resist is applied onto the silicon nitride film 104 and then the resist layer is patterned in a predetermined wiring shape. Then the lift-off process is carried out to form an aluminum thin film on the resist and thereafter remove the resist, thereby forming the wiring layer 115 of the aluminum thin film in the thickness of 200 μm (FIG. 18C). The coil layer 106 and three electrode pads 107,108, 116 are also formed at the same time as formation of the wiring layer 115.

Figure 18D:
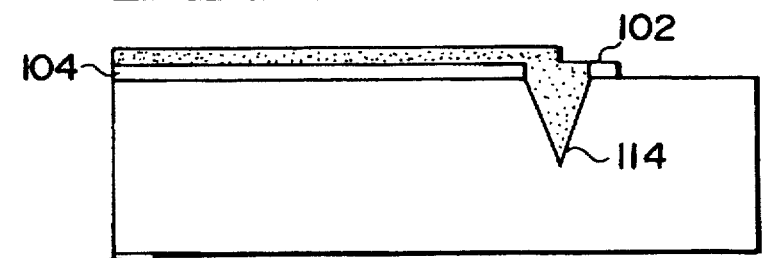
Figure 18E:
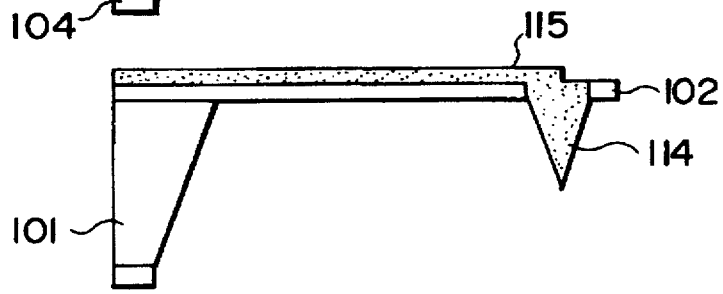

After that, unnecessary portions of the silicon nitride film 104 are removed by dry etching using a gas such as $CF_4$ or $SF_6$, thereby forming the finger portion 102 in a desired shape (FIG. 18D). Next, the silicon portion exposed from the silicon nitride film 104 is eluted with the KOH solution or the like, thereby producing a structure having the finger portion 102 (FIG. 18E).

Two such structures are produced and are bonded to each other by an adhesive or by anode coupling between back surfaces of the support substrates 101 without the metal patterns or the like in the two structures. The microgripper 100 can be produced in this manner.

Using the microgripper 100 of the present embodiment thus obtained, a protozoan, such as a bell animalcule, as a microscopic body 300 was gripped in contact by the probes 114 and the resistance thereof was measured. Then it was confirmed that the resistance of the bell animalcule was able to be measured. It is a matter of course that the electrical measurement of gripped object may include various measurements including not only the resistance measurement but also the capacitance measurement between the probes 114.

Sixth Embodiment

The microgripper system of the present embodiment is formed substantially in the same arrangement as the above fifth embodiment, but is different from that of the above fifth embodiment only in the shape of the probes of the microgripper.

Figure 19:
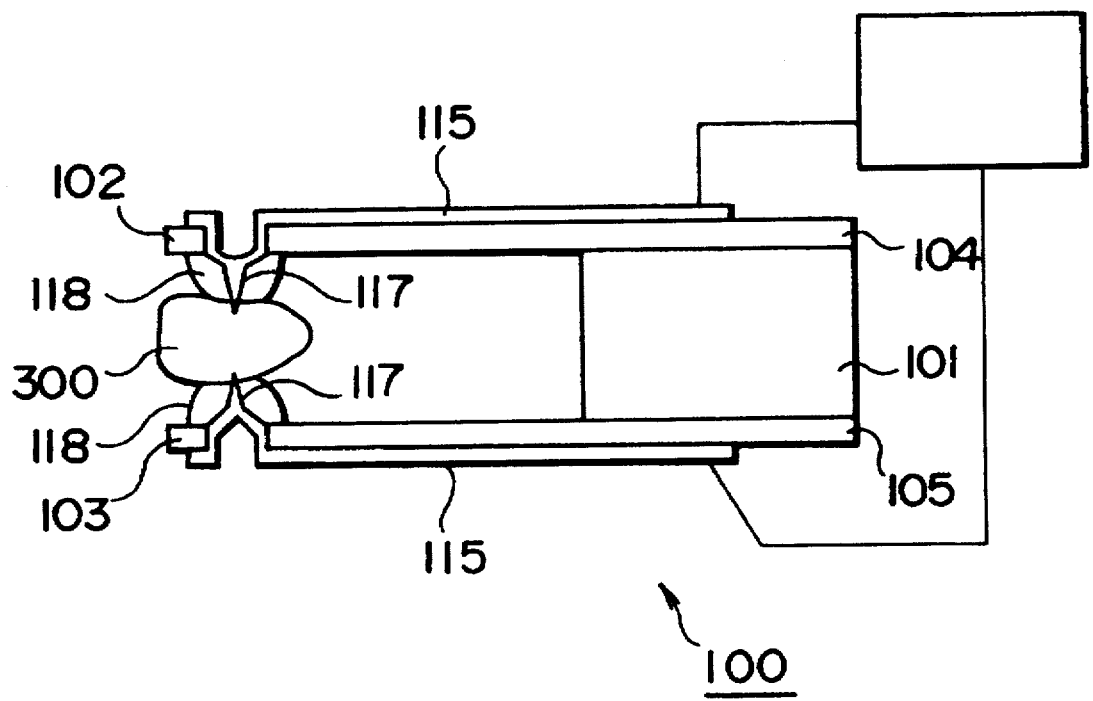
FIG. 19 is a sectional view to schematically show the configuration of the microgripper mounted in the sixth embodiment associated with the microgripper system of the present invention.

As shown in FIG. 19, the microgripper 100 of the present embodiment is different from the microgripper 100 of the above fifth embodiment in that metal probes 117 are formed in a square pyramid at the tip regions of the two finger portions 102, 103, in place of the probes 114. The base of the each probe 117 is covered by an insulating member 118.

Namely, only the tip portion of the probes 117 are formed so as to project out from the insulating members 118. The inside of the probes 117 is almost hollow.

A process for fabricating such a microgripper 100 is explained referring to FIG. 20A to FIG. 20F.

Figure 20A:
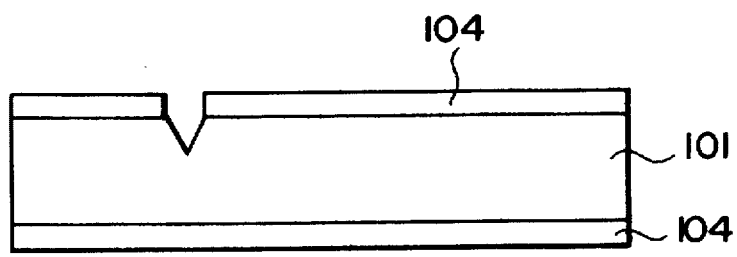
FIGS. 20A to 20F are sectional views to show a sequence of fabrication steps of the microgripper of FIG. 19.

By the low pressure vapor phase epitaxy using starting materials of dichlorosilane and ammonia gas, a silicon nitride film 104 is formed in the thickness 700 nm on an n-type silicon substrate 101 of the diameter 3 inches, the thickness 250 μm, and the (100) plane orientation. Further, the silicon nitride film 104 on the substrate 101 is partially removed by the photolithography process and dry etching process. The shape removed from the silicon nitride film 104 is square about 5 μm to 10 μm each side. The pattern shape, size, and number of the removed portion can be arbitrarily determined depending upon the object to be gripped. After that, the substrate 101 is immersed in a silicon etchant, such as the KOH solution or the TMAH solution, to etch the silicon part exposed from the silicon nitride film 104 in a square pyramid, thereby forming a recess (FIG. 20A).

Figure 20B:
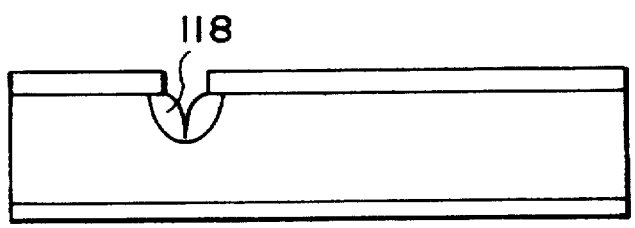

After that, the substrate 101 is set in an electric oven to grow a silicon dioxide film in the silicon recess portion exposed, thereby forming an insulating member 118 (FIG. 20B). As well known, there is the property that the growing rate of silicon dioxide film is fast in a flat portion but slow in a corner portion, and the silicon dioxide film grown in the recess groove thus becomes thin at the bottom portion.

Figure 20C:
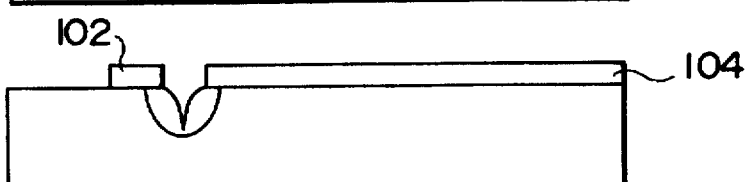
Figure 20D:
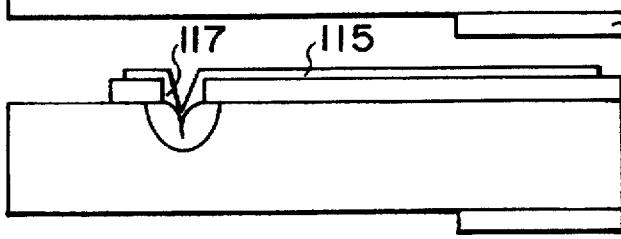

Then the silicon nitride film 104 formed on the top surface of substrate 101 is patterned in the shape of the finger portion 102 and patterning is done to remove unnecessary portions of the silicon nitride film 104 formed on the back side of substrate 101 (FIG. 20C). Further, a film of a metal such as gold or platinum is patterned on the top side of substrate 101 by the lift-off process, thereby forming the probe 117, coil layer 106, wiring layer 115, and three electrode pads 107, 108, 116 at a time (FIG. 20D).

Figure 20E:
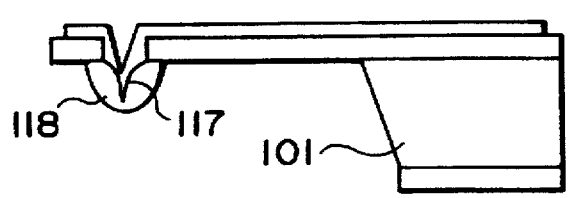
Figure 20F:
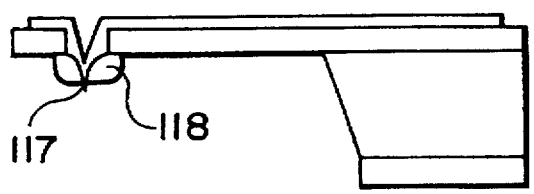

After that, the sample is immersed in the TMAH solution to elute only unnecessary silicon parts, thereby forming a structure having the finger portion 102 in a cantilever form (FIG. 20E). The sample is then immersed in the KOH solution to etch and remove a very small amount of the insulating member 118, thereby forming the probe 117 exposed from the tip portion of the insulating member 118 (FIG. 20F).

Two such structures are formed and are bonded to each other by an adhesive or by anode coupling between surfaces of the two structures without metal wiring etc. The microgripper 100 with the probes 117 exposed from the tip portions of the insulating members 118 can be produced in this manner.

If the whole of the probes 117 are exposed from the insulating members 118 and if the microscopic body 300 of gripped object is soft, the depths of penetration of the probes 117 into the microscopic body 300 cannot be constant. The contact area cannot be constant in that case between the microscopic body 300 and the probes 117, which could result in failing to stably detect an electric characteristic of a same gripped object. For soft microscopic bodies 300, the microgripper 100 with the probes 117 exposing only their apexes from the insulating members can be used to stably detect the electric characteristic of such gripped objects, because the contact area can be kept constant between the probes 117 and the microscopic body 300.

Using the microgripper 100 of the present embodiment thus produced, a protozoan, such as a bell animalcule, as a microscopic body 300 was gripped in contact by the probes 117 and the resistance thereof was repeatedly measured, showing that dispersion in measurement was able to be reduced half.

Seventh Embodiment

The microgripper system of the present embodiment is formed substantially in the same arrangement as the above fifth embodiment, but is different from that of the above fifth embodiment only in the microgripper.

Figure 21:
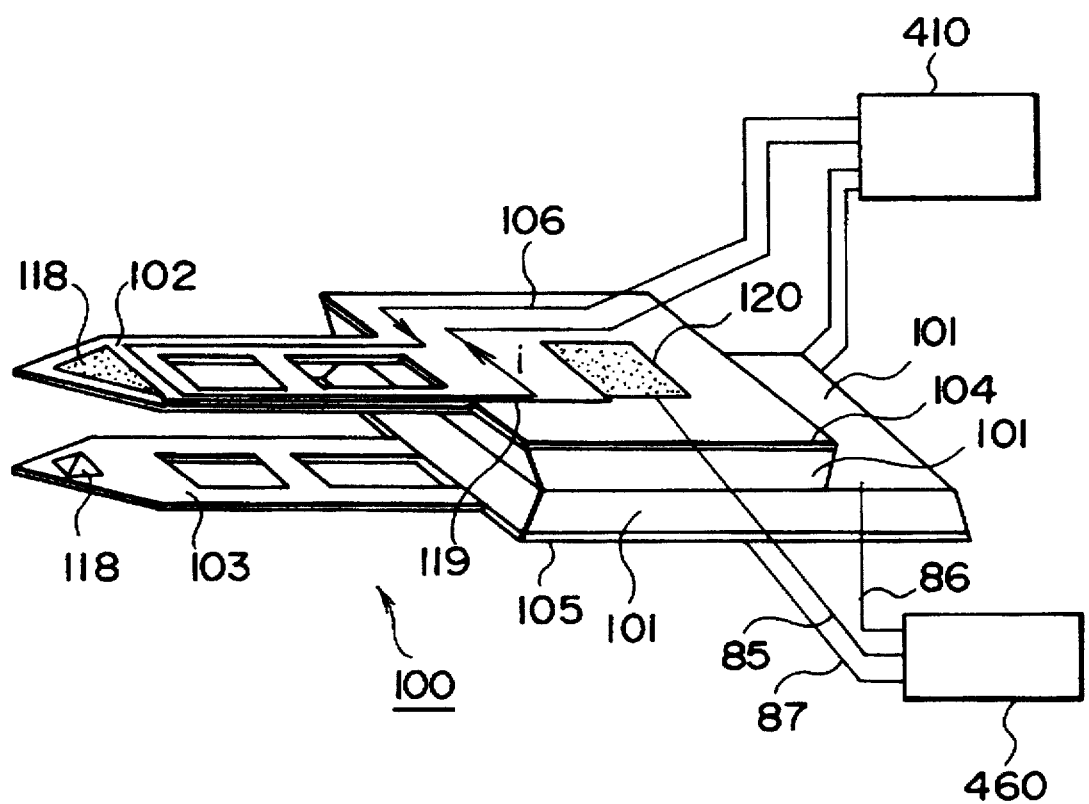
FIG. 21 is a sectional view to schematically show the configuration of the microgripper mounted in the seventh embodiment associated with the microgripper system of the present invention.

As shown in FIG. 21, the microgripper 100 of the present embodiment is different from the microgripper 100 of the above fifth embodiment in that thermocouples 118 are formed in a square pyramid at the tip regions of the two finger portions 102, 103 in order to measure the temperature of the microscopic body 300 of gripped object, in place of the probes 114. For that purpose, the thermocouples 118 are connected through wiring layers 119 formed on the outer surfaces of the pair of finger portions 102, 103 to the electrode pads 120 for electrical connection to the outside, formed on the two silicon nitride films 104, 105 fixed to the support substrate 101.

Further, these two electrode pads 120 formed on the silicon nitride films 104, 105 are electrically connected through a measuring apparatus 460 to the computer 400. This measuring apparatus 460 detects the temperature of the microscopic body 300 in contact with the thermocouples 118 of the microgripper 110 and outputs an electric detection signal indicating the temperature detected to the computer 400.

A process for fabricating the above microgripper 100 is explained referring to FIG. 22A to FIG. 22E.

Figure 22A:
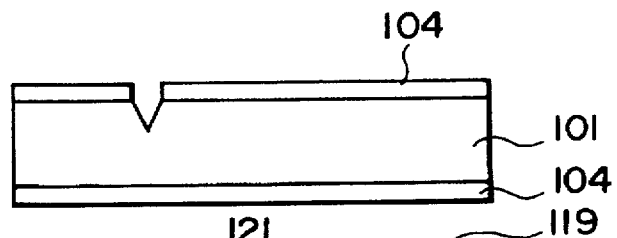
FIGS. 22A to 22E are sectional views to show a sequence of fabrication steps of the microgripper of FIG. 21.

First, by the low pressure vapor phase epitaxy using starting materials of dichlorosilane and ammonia gas, a silicon nitride film 104 is formed in the thickness 700 nm on an n-type silicon substrate 101 of the diameter 3 inches, the thickness 250 µm, and the (100) plane orientation, covered with a natural oxide film. Further, the silicon nitride film 104 on the surface of substrate 101 is partially removed by the photolithography process and dry etching process. The shape removed from the silicon nitride 104 is square about 5 µm to 10 µm each side. The pattern shape and size can be arbitrarily determined. After that, this substrate is immersed in a silicon etchant, such as the KOH solution or the TMAH solution, to etch a silicon part exposed from the silicon nitride 104 in a square pyramid, thereby forming a recess (FIG. 22A).

Figure 22B:
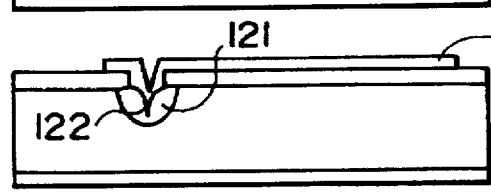

Then the sample is set in an electric oven to grow a silicon dioxide film in the portion of exposed recess, thereby forming an insulating member 121 there. As well known, there is the property that the growing rate of silicon dioxide film is fast in a flat portion, but slow in a corner portion. Thus, the thickness of the bottom part becomes extremely thin in the silicon dioxide film grown in the recess. A metal film, for example of gold, platinum, nichrome, chromel, alumel, platinum rhodium, or nickel, is patterned by the lift-off process on the top surface of the sample, thereby forming a metal base 122 of the thermocouple 118, the coil layer 106, the wiring layer 119, and the electrode pad 120 at a time (FIG. 22B).

Figure 22C:
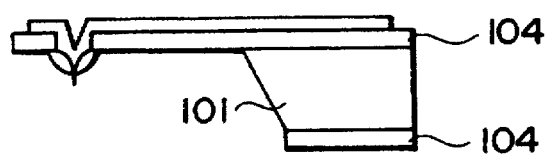

After that, this sample is subjected to patterning of the silicon nitride film 104 formed on the top surface of substrate 101 to form the finger portion 102 and to patterning of the SiN film 104 formed on the bottom side of substrate 101 to remove unnecessary portions thereof. Next, the sample is immersed in the TMAH solution in the concentration of 20 to 25 wt %, heated at 80° C., to elute only unnecessary silicon portions (FIG. 22C).

Figure 22D:
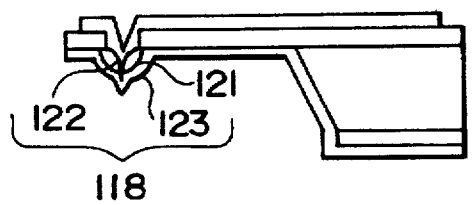
Figure 22E:
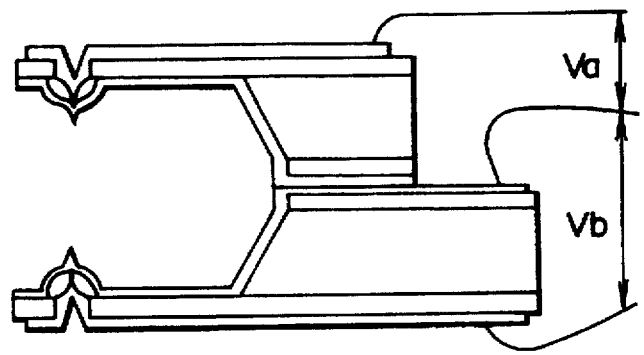

The sample is then immersed in the KOH solution in the concentration of 40 wt %, heated at 85° C., for about 30 minutes to etch and remove a very small amount of the insulating member 121, thereby slightly exposing the apex part of the metal base of the probe where the thickness of the silicon dioxide film is thinnest. Then a different type of metal film 123 from the metal base 122 is formed on the bottom face of substrate 101 to form the thermocouple 118 (FIG. 22D).

Two such structures are produced in the above process. The two structures are produced in different lengths of support substrates 101; the size of the smaller support substrate 101 is 2 mm wide and 4 mm long and the size of the larger is 2 mm wide and 8 mm long.

The two structures with the different sizes of support substrates 101 produced as described are bonded to each other with a conductive adhesive mainly containing silver, and the two electrode pads 120 and metal film 123 are electrically connected to the measuring apparatus 460 in order to measure thermoelectromotive forces Va and Vb of the two thermocouples 118. The metal film 123 is a common electrode to the two thermocouples 118.

Next explained is a method for measuring the temperature of the gripped object with the microgripper 100 thus formed.

The thermocouples 118 have the Seebeck effect to generate different electromotive forces in the respective metal bases 122 and metal film 123 depending upon the temperature of contact. Accordingly, the temperature of the microscopic body 300 can be measured by detecting the thermoelectromotive forces occurring in the two thermocouples 118 by the measuring apparatus 460 when the microgripper 100 grips the microscopic body 300 of gripped object. It is possible to perform independent temperature measurements at the thermocouples 118 each formed in the two finger portions 102, 103.

Using the microgripper 100 thus obtained, an egg of sea urchin in the diameter of about 100 µm was gripped as the microscopic body 300 and the same egg was irradiated with YAG laser beam, which confirmed that the temperature of the sample increased at the same time as irradiation of laser beam and also confirmed that temperature measurement of gripped substance, which had been impossible heretofore, became possible.

Although the present embodiment showed an example in which the thermocouples 118 were provided at the tip portions of the two finger portions 102, 103 of the microgripper 100, the temperature of sample can be measured with at least one thermocouple.

The present embodiment was so arranged that the sizes of the upper and lower support bases 101 were different from each other in order to measure the electromotive forces from the thermocouples 118, but the sizes of the support substrates 101 may be the same as long as the electromotive forces from the thermocouples 118 can be measured.

Eighth Embodiment

The microgripper system of the present embodiment is formed substantially in the same arrangement as the above first embodiment, but is different from that of the above first embodiment only in the microgripper.

Figure 23:
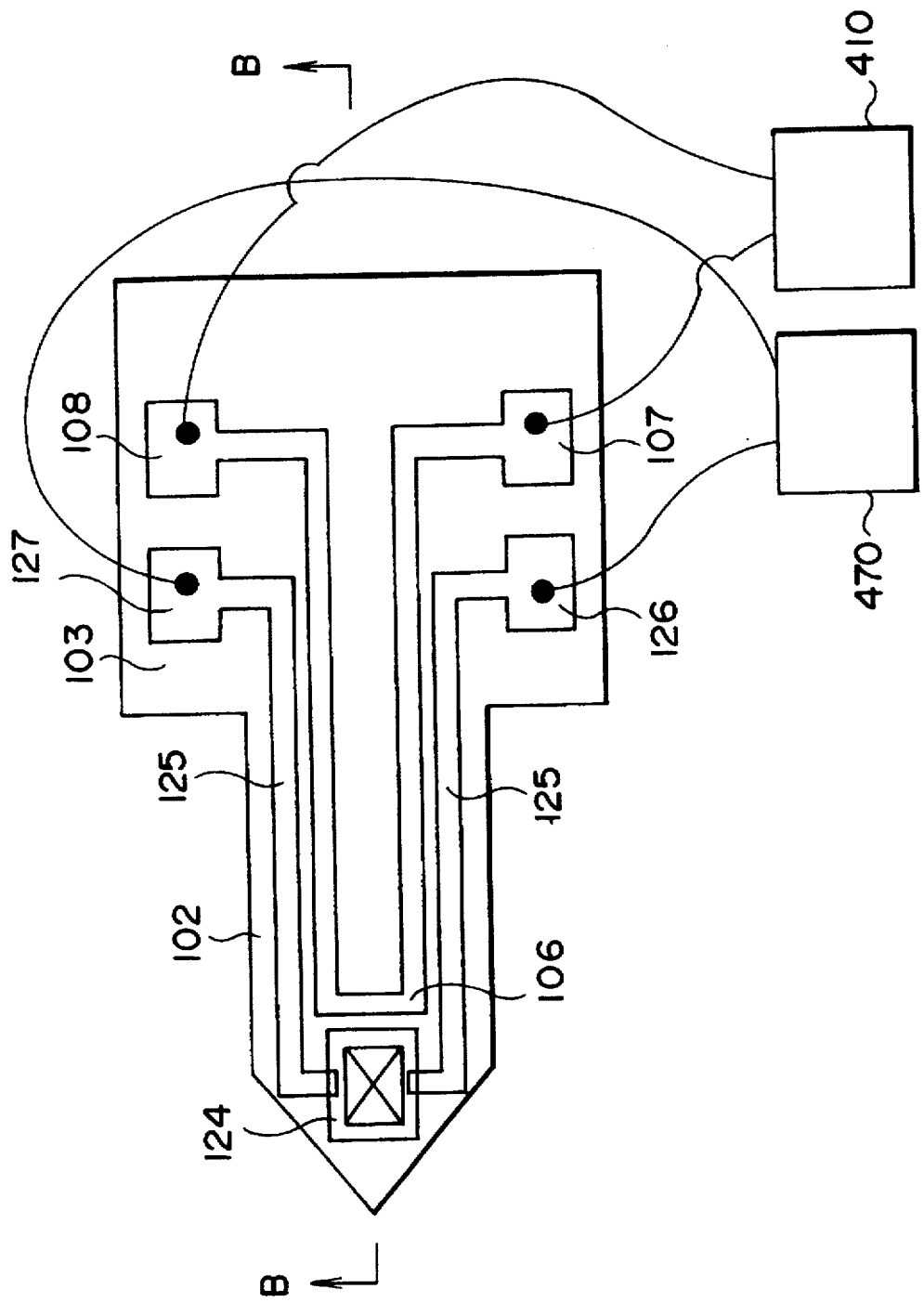
FIG. 23 is a sectional view to schematically show the configuration of the microgripper mounted in the eighth embodiment associated with the microgripper system of the present invention.
Figure 24:
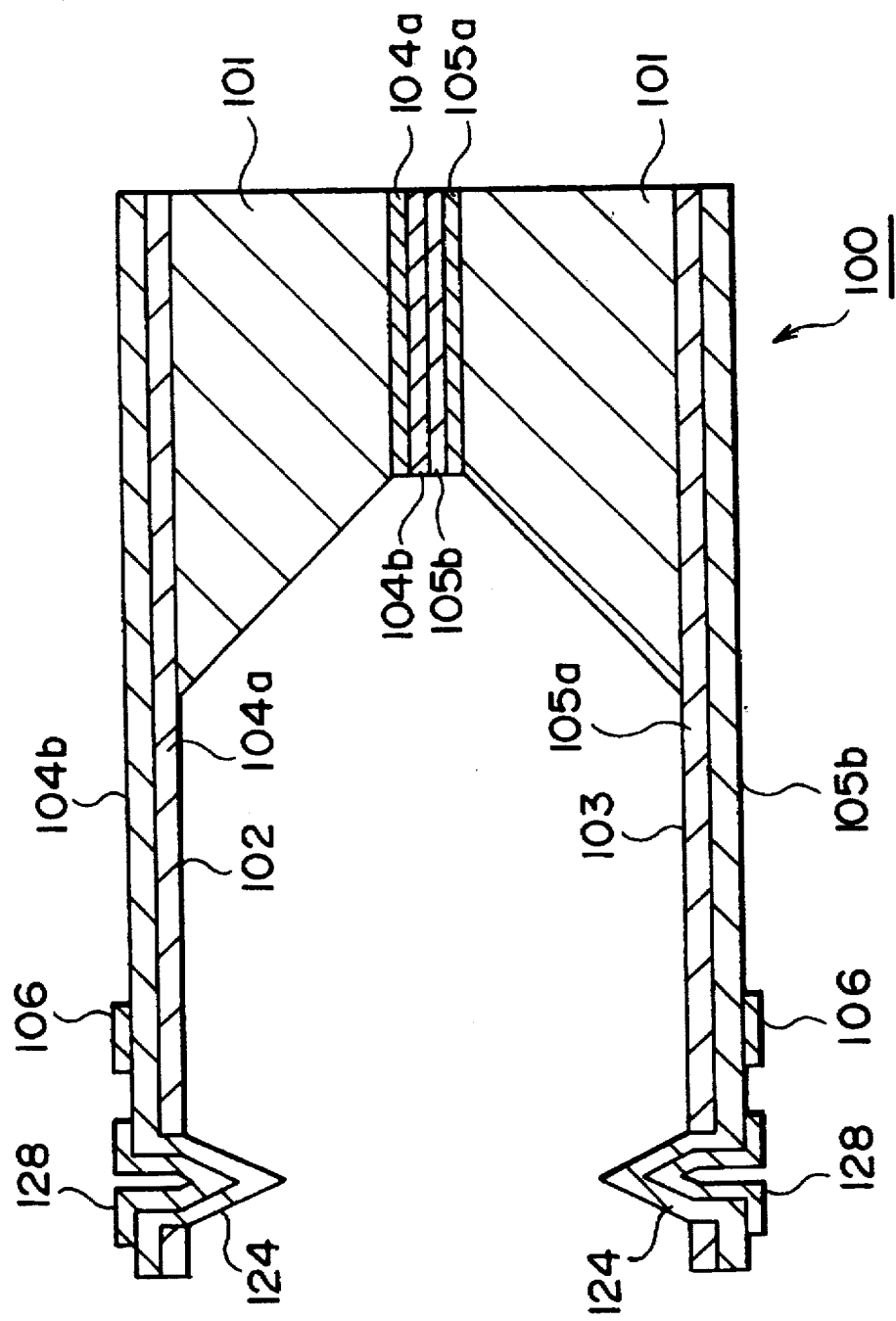
FIG. 24 is a sectional view to show the structure of the microgripper, taken along the line B—B in FIG. 23.

As shown in FIG. 23 and FIG. 24, the microgripper 100 of the present embodiment is different from the microgripper 100 of the above first embodiment in that heaters 124 are formed in a square pyramid at the tip regions of the two finger portions 102, 103 in order to locally heat the microscopic body 300 of gripped object, in place of the metal plates 109. The heaters 124 are connected through wiring layers 125 formed on the outer surfaces of the pair of finger portions 102, 103 to the two electrode pads 126, 127 for electrical connection to the outside, each formed on the two silicon nitride films 104, 105 fixed to the support substrate 101.

Here, inside each heater 124, there is a heating resistor 128 made of a material selected from high-resistance metals such as tantalum, nickel, or nichrome, and inorganic materials such as tantalum pentoxide, and formed in connection with the wiring layers 125. The two electrode pads 126, 127 formed on each of the two silicon nitride films 104, 105 are electrically connected to a heating power supply 470. The heating power supply 470 supplies an electric current to the heaters 124 of the microgripper 110 to heat the microscopic body 300 in contact with the heaters 124.

A process for fabricating the above microgripper 100 is next explained referring to FIG. 25A to FIG. 25D.

First, by the low pressure vapor phase epitaxy using the raw materials of dichlorosilane and ammonia gas, a silicon nitride film 104a is formed in the thickness 400 nm on the both surfaces of an n-type silicon substrate 101 of the diameter 3 inches, the thickness 250 μm, and the (100) plane orientation. Further, the silicon nitride film 104a on the top surface of substrate 101 is subjected to patterning by the photolithography process and dry etching process to form a square aperture about 5 μm to 10 μm each side exposing the surface of the substrate 101. The pattern shape, size, and number of this aperture can be arbitrarily determined.

Figure 25A:
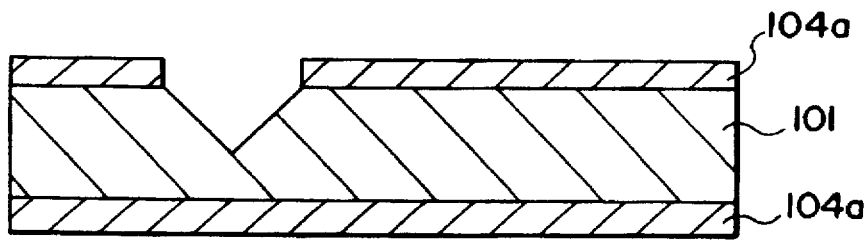
FIGS. 25A to 25D are sectional views to show a sequence of fabrication steps of the microgripper of FIG. 23.

After that, this substrate 101 is immersed in a silicon etchant such as the KOH solution or the TMAH solution to etch the exposed portion of the substrate 101 from the aperture in a square pyramid under the mask of the silicon nitride film 104a, thereby forming a trench of a square pyramid continuous to the aperture of the silicon nitride film 104a (FIG. 25A). Since the substrate 101 is one of the (100) plane orientation, etching automatically stops at the (111) plane of silicon, as well known, and thus, the faces of the trench become tapered faces at the angle of 54.7°.

Figure 25B:
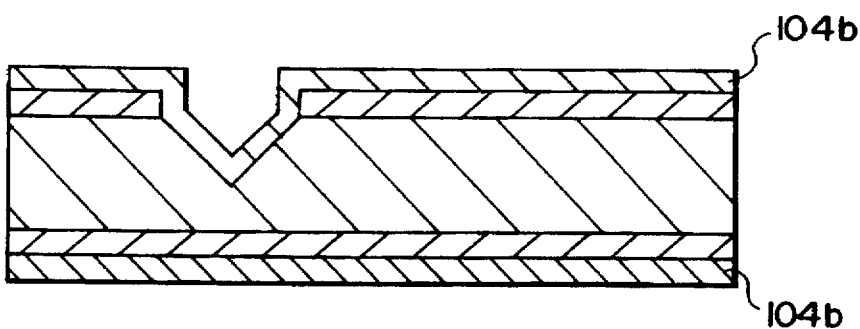

After that, a silicon nitride film 104b is formed in the thickness 300 nm on the both surfaces of the substrate 101 by the low pressure vapor phase epitaxy using the raw materials of dichlorosilane and ammonia gas (FIG. 25B).

Figure 25C:
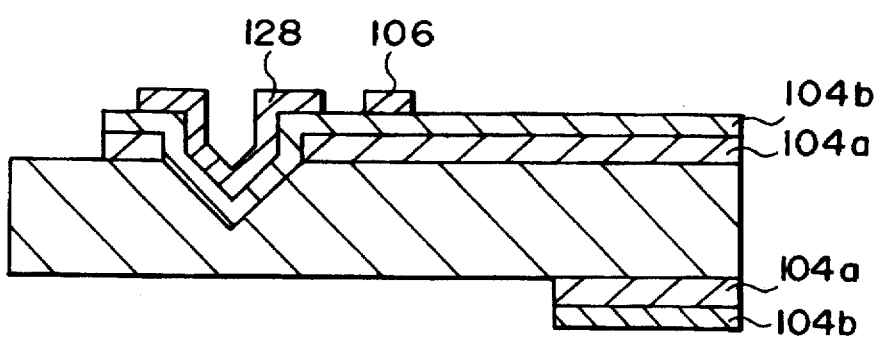

Next, on the top surface of the substrate 101, patterning is effected by the lift-off process or the like using a material selected from the high-resistance metal materials such as tantalum, nichrome, or nickel, and the inorganic materials such as tantalum pentoxide, thereby forming a rectangular heating resistor 128 in and around the portion of trench of the silicon nitride film 104b. Further, on the top surface of the silicon nitride film 104b patterning is effected by the lift-off process of a layer of a metal such as gold, aluminum, or copper, thereby forming the coil layer 106, the wiring layer 125, and the four electrode pads 107, 108, 126, 127. Then the silicon nitride films 104a, 104b on the both surfaces of the substrate 101 are subjected to patterning by the photolithography process and dry etching process in the desired shape of finger portion 102 and in the desired shape of support 101 (FIG. 25C).

Figure 25D:
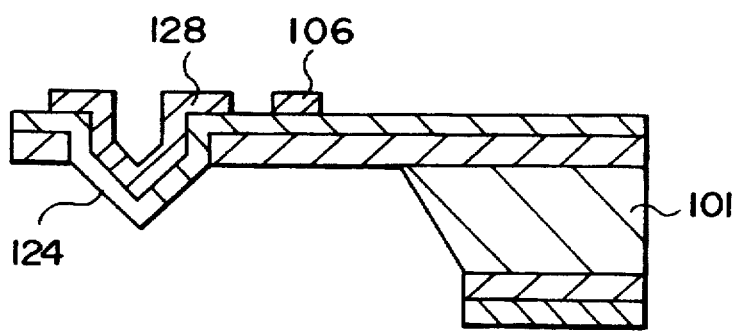

Then the substrate 101 is immersed in the TMAH solution in the concentration of 20 to 25 wt % heated at 80° C. or in the KOH solution in the concentration of 40 wt % heated at 85° C. to elute only unnecessary silicon portions. This forms a structure in a cantilever state (FIG. 25D).

Two such structures are prepared and are bonded to each other by an adhesive or the like between the portions to become the support substrates 101. This completes the microgripper 100.

When the heating power supply 470 supplies an electric current to the heating resistors 128 in the microgripper 100 formed in the above process, the heating resistors 128 generate Joule heat to heat the heaters 124. On this occasion, the heating resistors 128 of the two finger portions 102, 103 may be activated at the same time or only one heating resistor 128 may be activated.

Accordingly, the microgripper 100 can grip the microscopic body 300 of gripped object and can also locally heat the microscopic body 300 with the heaters 124 heated by the heating resistors 128. Therefore, analysis of thermal conduction of a microscopic region can be realized for gripped objects including microscopic mechanical parts and biochemical examination and evaluation can be realized for gripped objects including living samples.

For example, the microgripper 100 can locally heat an egg of sea urchin in the diameter of about 100 μm as a microscopic body 300 while gripping it. When the temperature of the egg is simultaneously measured with a temperature measuring device using infrared light, it is confirmed that the temperature of the egg increases depending upon the ampere of the current supplied to the heating resistors 128.

Ninth Embodiment

The microgripper system of the present embodiment is formed substantially in the same arrangement as the above eighth embodiment, but is different from that of the above eighth embodiment only in the microgripper.

Figure 26A:
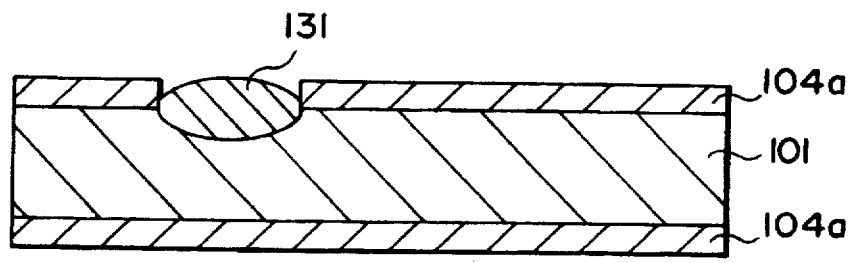
FIGS. 26A to 26D are sectional views to show a sequence of fabrication steps of the microgripper mounted in the ninth embodiment associated with the microgripper system of the present invention.
Figure 26B:
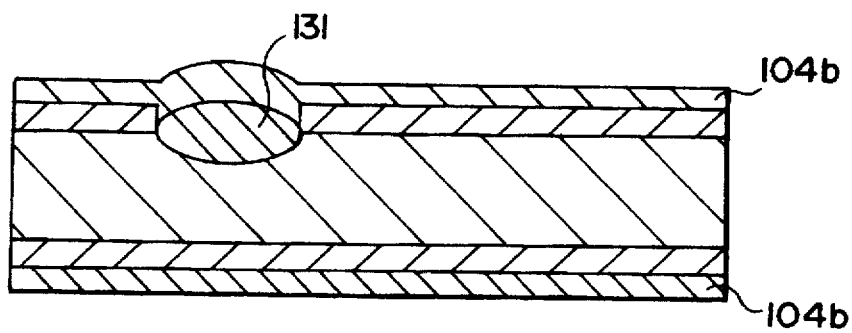
Figure 26C:
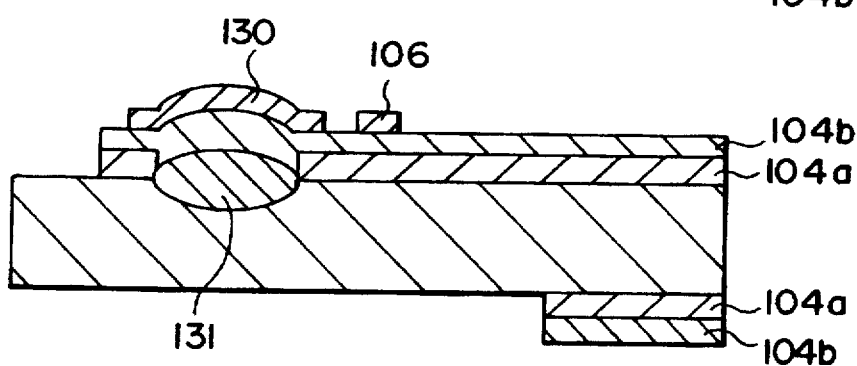
Figure 26D:
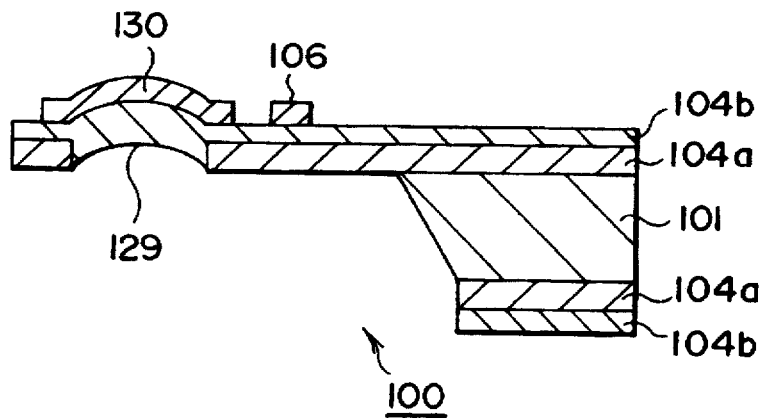

As shown in FIG. 26D, the microgripper 100 of the present embodiment is different from the microgripper 100 of the above eighth embodiment in that heaters 129 are formed in a spherical shape at the tip regions of the two finger portions 102, 103, instead of the heaters 124 in the square pyramid. Inside the heater 129 a heating resistor 130, made of a material selected from the high-resistance metals such as tantalum, nickel, or nichrome and the inorganic materials such as tantalum pentoxide, is formed in connection with the wiring layers 125.

A process for fabricating the above microgripper 100 is next explained referring to FIG. 26A to FIG. 26D.

First, a silicon nitride film 104a is formed on the both surfaces of the silicon substrate 101 by the low pressure vapor phase epitaxy using the raw materials of dichlorosilane and ammonia gas. Further, the silicon nitride film 104a on the top surface of the substrate 101 is subjected to patterning by the photolithography process and dry etching process to form a circular aperture exposing the surface of the substrate 101 at a predetermined position of the silicon nitride film 104a on the top surface of substrate 101. The pattern shape, size, and number of this aperture can be arbitrarily determined.

After that, this substrate 101 is set and heated in an electric oven to grow a silicon dioxide film 131 in the portion of substrate 101 exposed from the aperture by thermal oxidation (FIG. 26A). As well known, there is the property that the growing rate of silicon dioxide film is fast in a flat portion, but slow in a corner portion. Accordingly, the silicon dioxide film 131 thus grown has a nearly ellipsoidal cross section.

Then a silicon nitride film 104b is formed on the both surfaces of the substrate 101 by the low pressure vapor phase epitaxy using the raw materials of dichlorosilane and ammonia gas (FIG. 26B).

Next, in the top surface of substrate 101, patterning is effected by the lift-off process or the like using a material selected from the high-resistance metal materials such as tantalum, nichrome, or nickel, and the inorganic materials such as tantalum pentoxide, thereby forming a circular heating resistor 130 above and around the silicon dioxide film 104b. Further, patterning is effected by the lift-off process or the like of a layer of a metal such as gold, aluminum, or copper on the top surface of the silicon nitride film 104b, thereby forming the coil layer 106, the wiring layer 125, and the four electrode pads 107, 108, 126, 127. Then the silicon nitride films 104a, 104b on the both surfaces of the substrate 101 are subjected to patterning by the photolithography process and dry etching process in the desired shape of finger portion 102 and in the desired shape of support substrate 101 (FIG. 26C).

After that, the substrate 101 is immersed in the TMAH solution or the KOH solution to elute unnecessary silicon portions and silicon dioxide film 121. This forms a structure in a cantilever state. Two such structures are prepared and bonded to each other by an adhesive or the like between the portions to become the support substrates 101. This completes the microgripper 100 of the present embodiment.

Tenth Embodiment

The microgripper system of the present embodiment is formed substantially in the same arrangement as the above eighth embodiment, but is different from that of the above eighth embodiment only in the microgripper.

Figure 27A:
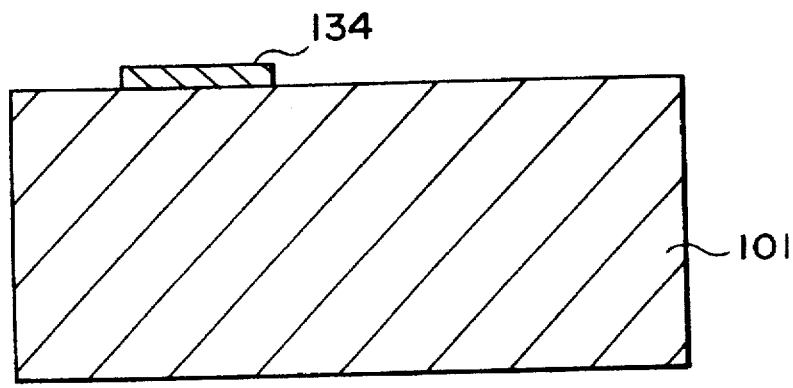
FIGS. 27A to 27D are sectional views to show a sequence of fabrication steps of the microgripper mounted in the tenth embodiment associated with the microgripper system of the present invention.
Figure 27B:
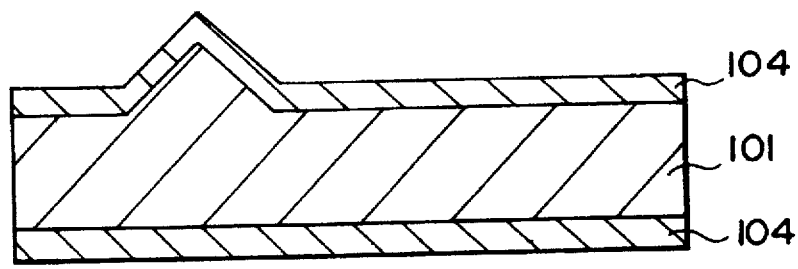
Figure 27C:
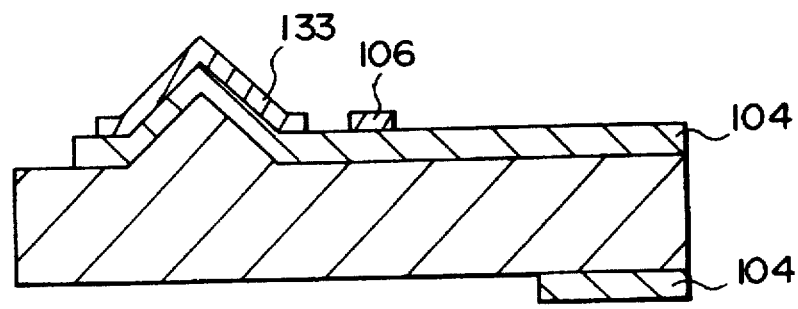
Figure 27D:
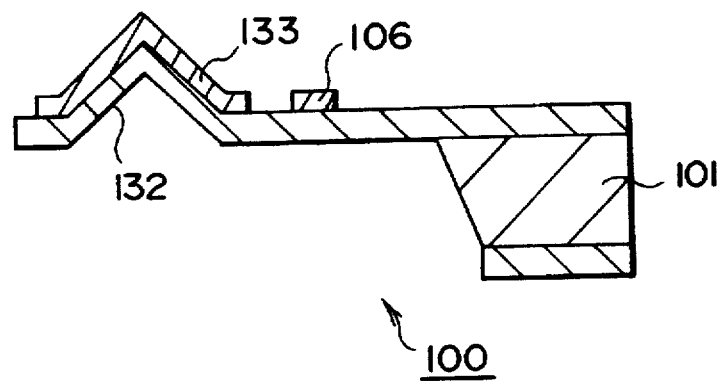

As shown in FIG. 27D, the microgripper 100 of the present embodiment is different from the microgripper 100 of the above eighth embodiment in that heaters 132 are formed in a circular cone at the tip regions of the two finger portions 102, 103, in place of the heaters 124 in a square pyramid. Inside the heater 132 a heating resistor 133, made of a material selected from the high-resistance metals such as tantalum, nickel, or nichrome, and the inorganic materials such as tantalum pentoxide, is formed in connection with the wiring layers 125.

A process for fabricating the above microgripper 100 is next explained referring to FIG. 27A to FIG. 27D.

First, a circular mask 134 is formed at a predetermined position on the top surface of the silicon substrate 101 (FIG. 27A). The pattern shape, size, and number of the mask 134 can be arbitrarily determined.

After that, this substrate 101 is immersed in a hydrofluoric acid (HF) solution to isotropically etch silicon, thereby changing the top surface of the silicon substrate 101 into a form of a plate having a cone projection. This etching separates the mask 134 from the silicon substrate 101. On the both surfaces of the silicon substrate 101 in this state a silicon nitride film 104 is formed by the low pressure vapor phase epitaxy using the raw materials of dichlorosilane and ammonia gas (FIG. 27B).

Next, on the top surface of substrate 101, patterning is effected by the lift-off process or the like using a material selected from the high-resistance metal materials such as tantalum, nichrome, or nickel, and the inorganic materials such as tantalum pentoxide, thereby forming a circular heating resistor 133 above and around the SiN film 104. Further, patterning is effected by the lift-off process or the like of a metal layer, for example, of gold, aluminum, or copper on the top surface of the silicon nitride film 104, thereby forming the coil layer 106, the wiring layer 125, and the four electrode pads 107, 108, 126, 127. Then the silicon nitride films 104 on the both surfaces of the substrate 101 are subjected to patterning by the photolithography process and dry etching process in the desired shape of finger portion 102 and in the desired shape of support substrate 101 (FIG. 27C).

Then the substrate 101 is immersed in the TMAH solution or the KOH solution to elute unnecessary silicon portions exposed by the patterning. This forms a structure in a cantilever state. Then two such structures are prepared and bonded to each other by an adhesive or the like between the portions to become the support substrates. This completes the microgripper 100.

Eleventh Embodiment

The microgripper system of the present embodiment is formed substantially in the same arrangement as the above seventh embodiment or eighth embodiment, but is different from that of the above seventh or eighth embodiment only in the microgripper.

Figure 28:
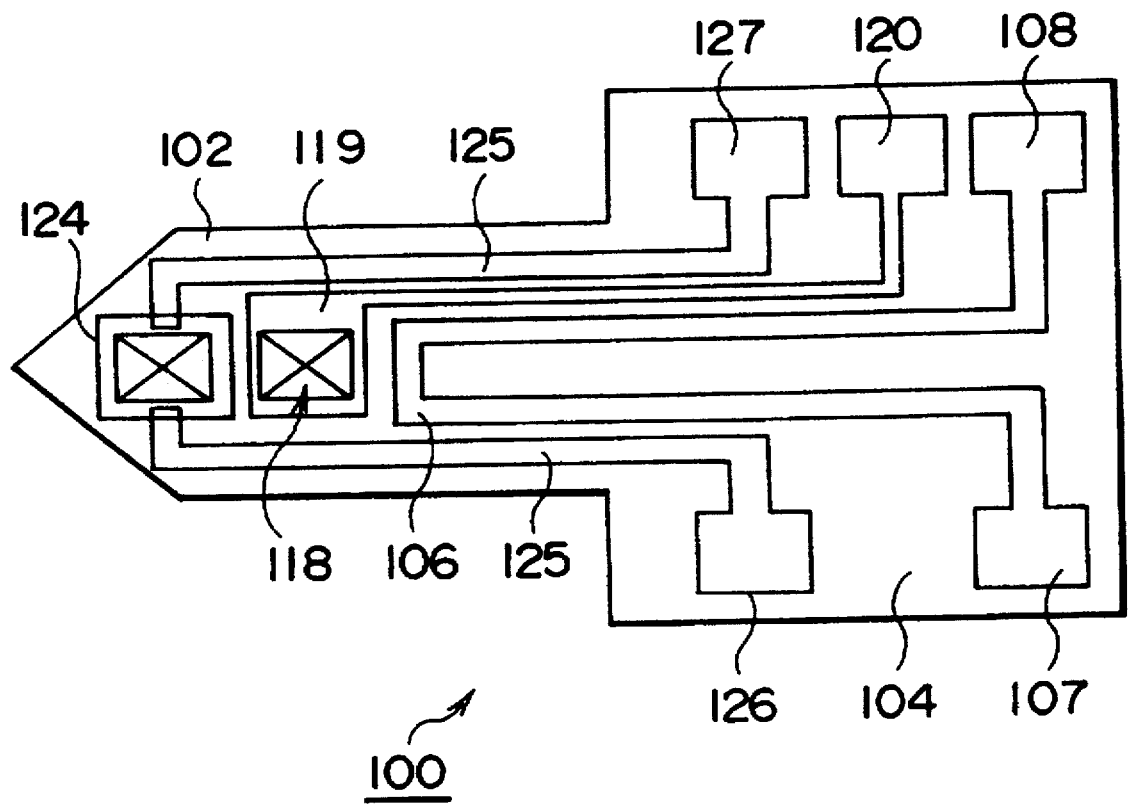
FIG. 28 is a sectional view to schematically show the configuration of the microgripper mounted in the eleventh embodiment associated with the microgripper system of the present invention.

As shown in FIG. 28, the microgripper 100 of the present embodiment is different from the microgripper 100 of the above seventh or eighth embodiment in that at the tip regions of the two finger portions 102, 103 the thermocouples 118 are formed in a square pyramid in order to measure the temperature of the microscopic body 300 of gripped object and the heaters 124 are formed in a square pyramid in order to locally heat the microscopic body 300 of gripped object.

Here, the thermocouple 118 is connected through the wiring layer 119 formed on the outer surface of each of the pair of finger portions 102, 103 to the electrode pad 120 for electrical connection to the outside, formed on each of the two silicon nitride films 104, 105 fixed to the support substrate 101. The heater 124 is connected through the wiring layers 125 formed on the outer surface of each of the pair of finger portions 102, 103 to the two electrode pads 126, 127 for electrical connection to the outside, formed on each of the two silicon nitride films 104, 105 fixed to the support substrate 101.

Further, the two electrode pads 120 formed on the two silicon films 104, 105 are electrically connected through the measuring apparatus 460 to the computer 400. This measuring apparatus 460 detects the temperature of the microscopic body 300 in contact with the thermocouples 118 of the microgripper 110 and outputs an electric detection signal indicating the temperature detected to the computer 400. The two electrode pads 126, 127 formed on each of the two silicon nitride films 104, 105 are electrically connected to the heating power supply 470. This heating power supply 470 supplies an electric current to the heaters 124 of the microgripper 110 to heat the microscopic body 300 in contact with the heaters 124.

A process for fabricating the above microgripper 100 is next explained referring to FIG. 29A to FIG. 29D.

Figure 29A:
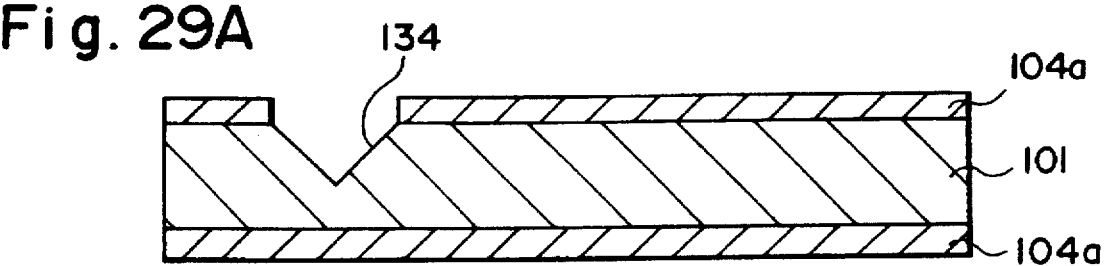
FIGS. 29A to 29D are sectional views to show a sequence of fabrication steps of the microgripper of FIG. 28.

First, a silicon nitride film 104a is formed on the both surfaces of the n-type silicon substrate 101 of the (100) plane orientation by the low pressure vapor phase epitaxy using the raw materials of dichlorosilane and ammonia gas. Further, the silicon nitride film 104a on the top surface of substrate 101 is subjected to patterning by the photolithography process and dry etching process, thereby forming a square aperture exposing the surface of substrate 101 at a predetermined position of the silicon nitride film 104 on the top surface of substrate 101. The pattern shape, size, and number of this aperture can be arbitrarily determined. After that, this substrate 101 is immersed in a silicon etchant such as the KOH solution or the TMAH solution to etch the portion of substrate 101 exposed from the aperture in a square pyramid under the mask of the silicon nitride film 104a, thereby forming a trench 134 in a square pyramid continuous to the aperture of the silicon nitride film 104a (FIG. 29A).

Figure 29B:
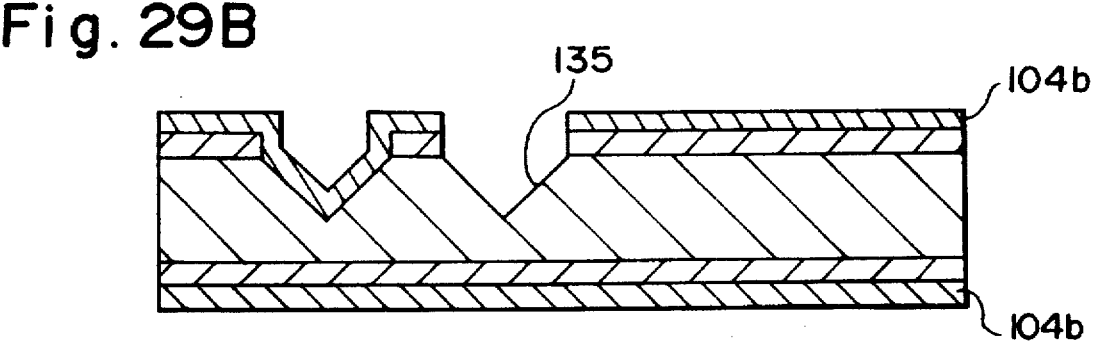

Then a silicon nitride film 104a is formed on the both surfaces of the substrate 101 by the low pressure vapor phase epitaxy using the raw materials of dichlorosilane and ammonia gas. Next, the silicon nitride films 104a, 104b on the top surface of the substrate 101 are subjected to patterning by the photolithography process and dry etching process, thereby forming a square aperture exposing the surface of the substrate 101 at a predetermined position of the silicon nitride films 104a, 104b on the top surface of substrate 101. The pattern shape, size, and number of this aperture may be arbitrarily determined. After that, this substrate is again immersed in a silicon etchant such as the KOH solution or the TMAH solution to etch the portion of substrate 101 exposed from the apertures in a square pyramid under the mask of the silicon nitride film 104b, thereby forming a trench 135 in a square pyramid continuous to the aperture (FIG. 29B).

After that, the substrate 101 is set and heated in an electric oven to grow a silicon dioxide film by thermal oxidation in the portion of trench 135 of substrate 101 exposed, thereby forming an insulating member 121. As well known, there is the property that the growing rate of silicon dioxide film is fast in a flat portion, but slow in a corner portion. Thus, the silicon dioxide film grown in the portion of trench 135 is extremely thin in the thickness of the bottom part than in the other portions.

Next, on the top surface of this substrate, patterning is effected by the lift-off process using a material selected from the high-resistance metal materials such as tantalum, nichrome, or nickel, and the inorganic materials such as tantalum pentoxide, thereby forming a rectangular heating resistor 128 in and around the portion of trench 134 in the silicon dioxide film 104b. Further, patterning is effected by a known technique such as the lift-off process of a metal film, for example of gold, platinum, nichrome, chrome, platinum rhodium, or nickel, on the top surface of the substrate, thereby forming the metal base 122 of the thermocouple 118, the coil layer 106, wiring layers 119, 125, and the five electrode pads 107, 108, 120, 126, 127.

Figure 29C:
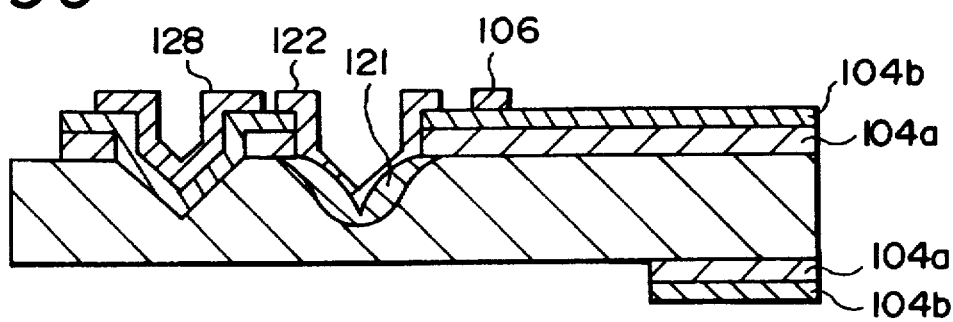

A projection formed in the portion of trench in the silicon dioxide film 121 by the patterning of metal film will be a junction part between different materials in the thermocouple 118, as apparent from the below explanation. Next, the silicon nitride films 104a, 104b on the both surfaces of the substrate 101 are subjected to patterning by the photolithography process and dry etching process in the desired shape of finger portion 102 and in the desired shape of support substrate 101 (FIG. 29C).

Figure 29D:
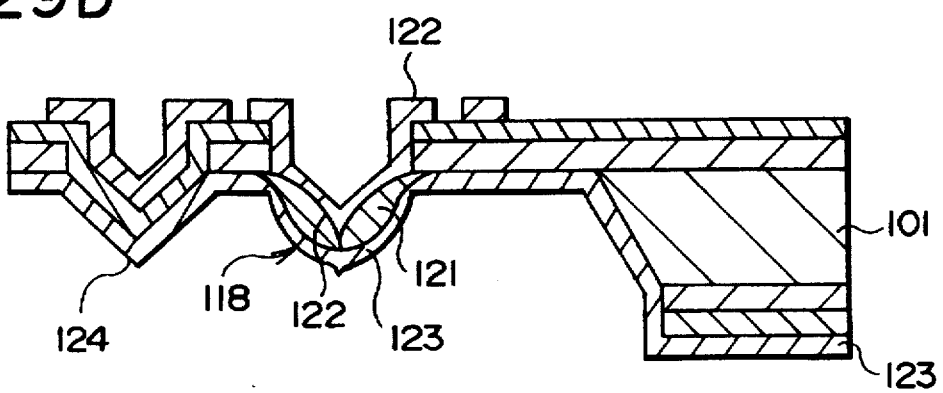

After that, this substrate is immersed in the TMAH solution to elute only unnecessary silicon portions. Further, this substrate is immersed in the KOH solution to isotropically etch and remove a very small amount of the silicon dioxide film 121, thereby slightly projecting the projection of the metal base 122 from the apex portion of the silicon dioxide film 121 after the etching removal, that is, from the thinnest portion before etching. Next, a metal film 123 of a different type of material from that of the base 122 is formed on the back face of this substrate 101 (FIG. 29D).

Then two such structures are prepared and bonded to each other by an adhesive or the like between the portions to become the support substrates. This completes the microgripper 100 of the present embodiment.

Therefore, the present embodiment can locally heat the microscopic body 300 by the regions of fingers of the microgipper 100 heated by the heaters 124 while gripping the microscopic body 300 of gripped object, and can also measure the temperature of the microscopic body 300. Thus, analysis of thermal conduction of the gripped object can be carried out more accurately and a local part of the gripped object can be maintained at a desired temperature by controlling an amount of supply current to the heating resistors 128 depending upon the temperature measured by the thermocouple 118.

Since the microgripper of the present embodiment has a heater 124 and a thermocouple 118 on a same finger, the distance between the heater 124 and the thermocouple 118 can be kept at a known constant value, which is more convenient in analysis of thermal conduction etc.

The various embodiments of the present invention were explained above, but it is noted that the present invention is by no means limited to these embodiments.

For example, it is preferred in the above embodiments that the pair of fingers of the microgripper have convex or concave portions as regions for gripping the gripped object and that the heaters heat the convex or concave portions of the finger portions, because heating portions can be readily specified with respect to the gripped object.

The microgripper may be constructed of any combination of the finger portions in the above various embodiments. There are no specific limitations on the number of heaters and the number of thermocouples. The heater may be formed in the both of the pair of fingers or in only one of them. The heater may be formed over the entire region for gripping the gripped object in the finger portion or may be formed only in a part of the region in the finger portion.

In the microgrippers of the above various embodiments, the Lorentz force was used while providing the finger portions with the coil layers in order to perform the opening and closing operation of the pair of finger portions, but the opening and closing operation of the fingers may be carried out by another method. For example, if the flexible plates forming the finger portions are made of two types of metal materials with different thermal expansion coefficients, the pair of finger portions can be opened and closed based on the bimetal effect caused by Joule heat generated when an electric current is supplied to the flexible plates. Without any extra modification, it is also possible in the above various embodiments to thermally drive the finger portions, utilizing a difference between the thermal expansion coefficients of the metal material for the coil layers and the silicon nitride film as being the material for the finger portions. In this case it is desired that the material located on the side where the pair of finger portions are opposed to each other have a smaller thermal expansion coefficient than that of the material located outside thereof.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application NO.96145/1995 filed on Mar. 29, 1995 is hereby incorporated by reference.

What is claimed is:

1. A master input apparatus for controlling a microgripper mounted on a micromanipulator, comprising:

a joystick apparatus mounted on a support body at a predetermined position, said joystick apparatus having a movable joystick and generating a first control signal based on a movement of said joystick and outputting the first control signal to the micromanipulator for displacing said microgripper; and a finger operating apparatus mounted on said joystick, said finger operating apparatus having an operation moving portion and a signal generating portion, wherein said operation moving portion comprises a movable protruding lever hinged on said joystick and adapted to be manually actuated, and said signal generating portion comprises a rotary potentiometer or a rotary encoder connected to said protruding lever for converting an amount of rotation of said protruding lever relative to said joystick and outputting a second control signal for controlling opening and closing of said microgripper.

2. The master input apparatus according to claim 1, wherein said joystick apparatus further includes a dial rotatably mounted on said joystick for vertically displacing said microgripper, and another signal generating portion for converting an amount of rotation of said dial relative to said joystick and outputting as a third control signal.

3. The master input apparatus according to claim 2, wherein said another signal generating portion comprises another rotary potentiometer or encoder for converting an amount of rotation of said dial relative to said joystick.

4. A microgripper system comprising:

a micromanipulator fixed near a stage;

a microgripper mounted on said micromanipulator, said microgripper being adapted to grip a microscopic body held by said stage;

a microscope apparatus for projecting an enlarged image of a motion of said microgripper relative to said microscopic body; and a master input apparatus for controlling said micromanipulator to displace said microgripper relative to said microscopic body and controlling opening and closing of said microgripper to grip and release said microscopic body, wherein said master input apparatus comprises:

a joystick apparatus mounted on a support body at a predetermined position, said joystick apparatus having a movable joystick and generating a first control signal based on a movement of said joystick and outputting the first control signal to said micromanipulator for displacing said microgripper; and a finger operating apparatus mounted on said joystick, said finger operating apparatus having an operation moving portion and a signal generating portion, wherein said operation moving portion comprises a movable protruding lever hinged on said joystick and adapted to be manually actuated, and said signal generating portion comprises a rotary potentiometer or a rotary encoder connected to said protruding lever for converting an amount of rotation of said protruding lever relative to said joystick and outputting a second control signal for controlling opening and closing of said microgripper.

5. The microgripper system according to claim 4, wherein said joystick apparatus further includes a dial rotatably mounted on said joystick for vertically displacing said microgripper, and another signal generating portion for converting an amount of rotation of said dial relative to said joystick and outputting as a third control signal.

6. The microgripper system according to claim 5, wherein said another signal generating portion comprises another rotary potentiometer or encoder for converting an amount of rotation of said dial relative to said joystick.

7. The microgripper system according to claim 4, wherein said microgripper comprises a support substrate fixed to said micromanipulator, a pair of finger portions supported in a cantilever form by said support substrate and opposed to each other, coil thin films formed along surfaces of said pair of finger portions for conducting the second control signal output from said master input apparatus, and magnetic field generating means for generating a magnetic field in a direction perpendicular to a longitudinal direction of said coil thin films to apply the magnetic field to said microgripper.

8. The microgripper system according to claim 7, further comprising a central control unit for arithmetically processing the second control signal and outputting a third control signal, and a direct current power supply for outputting a drive signal to said microgripper based on the third control signal.

9. The microgripper system according to claim 4, further comprising an image pickup device mounted on said microscope apparatus for taking a microscopical image of said microscopic body and said microgripper, and a monitor device mounted near said master input apparatus for displaying the microscopical image based on an image signal input thereto from said image pickup device.

* * * * *